United States Patent
Oyanagi et al.

(10) Patent No.: US 10,861,491 B2
(45) Date of Patent: *Dec. 8, 2020

(54) MAGNETIC TAPE

(71) Applicant: FUJIFILM Corporation, Tokyo (JP)

(72) Inventors: Masahito Oyanagi, Minami-ashigara (JP); Norihito Kasada, Minami-ashigara (JP); Takuto Kurokawa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 331 days.

This patent is subject to a terminal disclaimer.

(21) Appl. No.: 15/443,026

(22) Filed: Feb. 27, 2017

(65) Prior Publication Data

US 2017/0249963 A1 Aug. 31, 2017

(30) Foreign Application Priority Data

Feb. 29, 2016 (JP) .................................. 2016-037569

(51) Int. Cl.
| G11B 5/66 | (2006.01) |
| G11B 5/708 | (2006.01) |
| G11B 5/702 | (2006.01) |
| G11B 5/71 | (2006.01) |
| G11B 5/73 | (2006.01) |
| G11B 5/733 | (2006.01) |
| G11B 5/735 | (2006.01) |
| G11B 5/78 | (2006.01) |

(52) U.S. Cl.
CPC ............ *G11B 5/7085* (2013.01); *G11B 5/702* (2013.01); *G11B 5/71* (2013.01); *G11B 5/733* (2013.01); *G11B 5/7305* (2013.01); *G11B 5/735* (2013.01); *G11B 5/78* (2013.01)

(58) Field of Classification Search
CPC ... G11B 5/68–718; G11B 5/78; G11B 5/7305; G11B 5/735; G11B 5/733
See application file for complete search history.

(56) References Cited

U.S. PATENT DOCUMENTS

| 3,966,686 A | 6/1976 | Asakura et al. |
| 4,112,187 A | 9/1978 | Asakura et al. |
| 4,425,404 A | 1/1984 | Suzuki et al. |
| 4,693,930 A | 9/1987 | Kuo et al. |
| 4,746,569 A | 5/1988 | Takahashi et al. |
| 4,825,317 A | 4/1989 | Rausch |
| 5,242,752 A | 9/1993 | Isobe et al. |
| 5,419,938 A | 5/1995 | Kagotani et al. |
| 5,445,881 A | 8/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,645,917 A | 7/1997 | Ejiri et al. |
| 5,689,384 A | 11/1997 | Albrecht et al. |
| 5,728,454 A | 3/1998 | Inaba et al. |
| 5,786,074 A | 7/1998 | Soui |
| 5,827,600 A * | 10/1998 | Ejiri .................. G11B 5/70 428/141 |
| 5,835,314 A | 11/1998 | Moodera et al. |
| 6,099,957 A | 8/2000 | Yamamoto et al. |
| 6,183,606 B1 | 2/2001 | Kuo et al. |
| 6,207,252 B1 | 3/2001 | Shimomura |
| 6,228,461 B1 | 5/2001 | Sueki et al. |
| 6,254,964 B1 | 7/2001 | Saito et al. |
| 6,261,647 B1 | 7/2001 | Komatsu et al. |
| 6,268,043 B1 | 7/2001 | Koizumi et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |
| 6,770,359 B2 | 8/2004 | Masaki |
| 6,791,803 B2 | 9/2004 | Saito et al. |
| 6,835,451 B2 | 12/2004 | Ejiri |
| 6,835,461 B1 | 12/2004 | Yamagata et al. |
| 6,893,746 B1 | 5/2005 | Kirino et al. |
| 6,921,592 B2 | 7/2005 | Tani et al. |
| 6,939,606 B2 | 9/2005 | Hashimoto et al. |
| 6,950,269 B1 | 9/2005 | Johnson |
| 6,994,925 B2 | 2/2006 | Masaki |
| 7,014,927 B2 | 3/2006 | Sueki et al. |
| 7,029,726 B1 | 4/2006 | Chen et al. |

(Continued)

FOREIGN PATENT DOCUMENTS

| DE | 101 46 429 A1 | 3/2002 |
| EP | 0 520 155 B1 | 8/1996 |

(Continued)

OTHER PUBLICATIONS

U.S. Appl. No. 15/280,195, Allowed.
U.S. Appl. No. 15/422,821, Allowed.
U.S. Appl. No. 15/619,012, Allowed.
U.S. Appl. No. 15/624,897, Allowed.
U.S. Appl. No. 15/624,792, Allowed.
U.S. Appl. No. 15/626,832, Allowed.
U.S. Appl. No. 15/625,428, Allowed.
U.S. Appl. No. 15/380,336, Allowed.
U.S. Appl. No. 15/614,876, Allowed.
U.S. Appl. No. 15/620,916, Allowed.
U.S. Appl. No. 15/621,464, Allowed.
U.S. Appl. No. 15/854,383, Allowed.

(Continued)

*Primary Examiner* — Holly C Rickman
(74) *Attorney, Agent, or Firm* — Sughrue Mion, PLLC

(57) ABSTRACT

The magnetic tape has a magnetic layer containing ferromagnetic powder, abrasive, and binder on a nonmagnetic support, wherein the centerline average surface roughness Ra measured on the surface of the magnetic layer is less than or equal to 1.8 nm, the contact angle for 1-bromonaphthalene that is measured on the surface of the magnetic layer falls within a range of 45.0° to 60.0°, and the coefficient of friction that is measured on the base portion of the surface of the magnetic layer is less than or equal to 0.35.

16 Claims, No Drawings

(56) References Cited

U.S. PATENT DOCUMENTS

| | | |
|---|---|---|
| 7,153,366 B1 | 12/2006 | Chen et al. |
| 7,255,908 B2 | 8/2007 | Ishikawa et al. |
| 7,511,907 B2 | 3/2009 | Dugas et al. |
| 7,515,383 B2 | 4/2009 | Saito et al. |
| 7,656,602 B2 | 2/2010 | Iben et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,279,739 B2 | 10/2012 | Kanbe et al. |
| 8,318,242 B2 | 11/2012 | Bradshaw et al. |
| 8,524,108 B2 | 9/2013 | Hattori |
| 8,535,817 B2 | 9/2013 | Imaoka |
| 8,576,510 B2 | 11/2013 | Cherubini et al. |
| 8,681,451 B2 | 3/2014 | Harasawa et al. |
| 9,105,294 B2 | 8/2015 | Jensen et al. |
| 9,159,341 B2 | 10/2015 | Bradshaw et al. |
| 9,311,946 B2 * | 4/2016 | Tanaka .............. G11B 5/71 |
| 9,324,343 B2 | 4/2016 | Bradshaw et al. |
| 9,495,985 B2 | 11/2016 | Biskeborn et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |
| 9,704,525 B2 * | 7/2017 | Kasada .............. G11B 5/7013 |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Shirata |
| 9,773,519 B2 | 9/2017 | Kasada et al. |
| 9,779,772 B1 | 10/2017 | Kasada et al. |
| 9,837,104 B1 | 12/2017 | Biskeborn |
| 9,837,116 B2 | 12/2017 | Ozawa et al. |
| 9,959,894 B2 | 5/2018 | Omura |
| 9,972,351 B1 | 5/2018 | Kaneko et al. |
| 9,978,414 B1 | 5/2018 | Kaneko et al. |
| 9,984,710 B2 | 5/2018 | Kasada |
| 9,984,712 B1 * | 5/2018 | Ozawa .............. G11B 5/3909 |
| 9,984,716 B1 | 5/2018 | Kaneko et al. |
| 10,008,230 B1 | 6/2018 | Ozawa et al. |
| 10,026,430 B2 | 7/2018 | Kasada et al. |
| 10,026,433 B2 | 7/2018 | Kasada et al. |
| 10,026,434 B2 | 7/2018 | Oyanagi et al. |
| 10,026,435 B2 | 7/2018 | Kasada et al. |
| 10,062,403 B1 | 8/2018 | Kasada et al. |
| 10,074,393 B2 | 9/2018 | Kaneko et al. |
| 10,134,433 B2 | 11/2018 | Kasada et al. |
| 10,170,144 B2 | 1/2019 | Ozawa et al. |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 | 5/2003 | Ejiri et al. |
| 2003/0124386 A1 | 7/2003 | Masaki |
| 2003/0128453 A1 | 7/2003 | Saito et al. |
| 2003/0170498 A1 | 9/2003 | Inoue |
| 2003/0228492 A1 | 12/2003 | Ejiri et al. |
| 2003/0228493 A1 | 12/2003 | Doushita et al. |
| 2004/0018388 A1 | 1/2004 | Kitamura et al. |
| 2004/0053074 A1 | 3/2004 | Jingu et al. |
| 2004/0072025 A1 | 4/2004 | Kishimoto et al. |
| 2004/0197605 A1 | 10/2004 | Seki et al. |
| 2004/0213948 A1 | 10/2004 | Saito et al. |
| 2004/0218304 A1 | 11/2004 | Goker et al. |
| 2004/0265643 A1 | 12/2004 | Ejiri |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0187589 A1 | 8/2006 | Harasawa et al. |
| 2006/0232883 A1 | 10/2006 | Biskeborn et al. |
| 2007/0009769 A1 | 1/2007 | Kanazawa |
| 2007/0020489 A1 | 1/2007 | Yamazaki et al. |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0057351 A1 | 3/2008 | Meguro et al. |
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0073816 A1 | 3/2010 | Komori et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1 | 2/2012 | Tanaka et al. |
| 2012/0152891 A1 | 6/2012 | Brown et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1 * | 12/2014 | Kikuchi .............. G11B 5/7013 252/62.54 |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 * | 3/2016 | Kurokawa .............. G11B 5/71 428/840.4 |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |

(56) References Cited

U.S. PATENT DOCUMENTS

| | | |
|---|---|---|
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249965 A1 | 8/2017 | Kurokawa et al. |
| 2017/0249966 A1 | 8/2017 | Tachibana et al. |
| 2017/0287517 A1 | 10/2017 | Hosoya et al. |
| 2017/0337944 A1 | 11/2017 | Biskeborn et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |
| 2019/0259416 A1 | 8/2019 | Kawakami et al. |
| 2019/0295587 A1 | 9/2019 | Kasada |
| 2019/0295590 A1 | 9/2019 | Kaneko et al. |
| 2019/0304496 A1 | 10/2019 | Fujimoto |
| 2020/0005814 A1 | 1/2020 | Kasada et al. |
| 2020/0005818 A1 | 1/2020 | Kasada et al. |
| 2020/0005822 A1 | 1/2020 | Kasada et al. |
| 2020/0005827 A1 | 1/2020 | Ozawa et al. |
| 2020/0035262 A1 | 1/2020 | Kasada |
| 2020/0126589 A1 | 4/2020 | Iwamoto et al. |

FOREIGN PATENT DOCUMENTS

| | | |
|---|---|---|
| GB | 2495356 A | 4/2013 |
| JP | 61-11924 A | 1/1986 |
| JP | 61-139923 A | 6/1986 |
| JP | 61-139932 A | 6/1986 |
| JP | 63-129519 A | 6/1988 |
| JP | 63-249932 A | 10/1988 |
| JP | 63-298813 A | 12/1988 |
| JP | 64-057422 A | 3/1989 |
| JP | 64-60819 A | 3/1989 |
| JP | 1-276424 A | 11/1989 |
| JP | 2-227821 A | 9/1990 |
| JP | 5-258283 A | 10/1993 |
| JP | 5-298653 A | 11/1993 |
| JP | 7-57242 A | 3/1995 |
| JP | 9-073626 A | 3/1997 |
| JP | 11-110743 A | 4/1999 |
| JP | 11-175949 A | 7/1999 |
| JP | 11-259849 A | 9/1999 |
| JP | 11-273051 A | 10/1999 |
| JP | 2000-251240 A | 9/2000 |
| JP | 2002-157726 A | 5/2002 |
| JP | 2002-298332 A | 10/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-005793 A | 1/2004 |
| JP | 2004-005820 A | 1/2004 |
| JP | 2004-103186 A | 4/2004 |
| JP | 2004-114492 A | 4/2004 |
| JP | 2004-133997 A | 4/2004 |
| JP | 2004-185676 A | 7/2004 |
| JP | 2005-38579 A | 2/2005 |
| JP | 2005-092967 A | 4/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-265555 A | 10/2007 |
| JP | 2007-273039 A | 10/2007 |
| JP | 2007-287310 A | 11/2007 |
| JP | 2007-297427 A | 11/2007 |

(56) References Cited

FOREIGN PATENT DOCUMENTS

| JP | 2007-305197 A | 11/2007 |
|----|---------------|---------|
| JP | 2008-047276 A | 2/2008 |
| JP | 2008-243317 A | 10/2008 |
| JP | 2009-245515 A | 10/2009 |
| JP | 2009-283082 A | 12/2009 |
| JP | 2010-036350 A | 2/2010 |
| JP | 2010-49731 A | 3/2010 |
| JP | 2011-48878 A | 3/2011 |
| JP | 2011-138566 A | 7/2011 |
| JP | 2011-187142 A | 9/2011 |
| JP | 2011-210288 A | 10/2011 |
| JP | 2011-225417 A | 11/2011 |
| JP | 2012-38367 A | 2/2012 |
| JP | 2012-043495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-502224 A | 1/2016 |
| JP | 2016-051493 A | 4/2016 |
| JP | 2016-071912 A | 5/2016 |
| JP | 2016-71926 A | 5/2016 |
| JP | 2016-126817 A | 7/2016 |
| JP | 2016-139451 A | 8/2016 |
| JP | 2016-177851 A | 10/2016 |
| JP | 2017-041291 A | 2/2017 |

OTHER PUBLICATIONS

U.S. Appl. No. 15/854,439, Allowed.
U.S. Appl. No. 15/848,173, Allowed; QPIDS filed.
U.S. Appl. No. 15/628,814, Allowed.
U.S. Appl. No. 15/690,400, Allowed.
U.S. Appl. No. 15/690,906, Allowed.
U.S. Appl. No. 15/626,355, Allowed.
U.S. Appl. No. 15/627,696, Allowed.
U.S. Appl. No. 15/388,911, Pending.
U.S. Appl. No. 15/380,309, Allowed.
U.S. Appl. No. 15/854,409, Pending.
U.S. Appl. No. 15/920,563, Allowed; QPIDS filed.
U.S. Appl. No. 15/920,533, Pending.
U.S. Appl. No. 15/900,144, Allowed.
U.S. Appl. No. 15/900,080, Allowed.
U.S. Appl. No. 15/900,230, Allowed.
U.S. Appl. No. 15/900,164, Allowed.
U.S. Appl. No. 15/920,518, Allowed.
U.S. Appl. No. 15/899,587, Pending.
U.S. Appl. No. 15/899,430, Allowed.
U.S. Appl. No. 15/920,515, Allowed.
U.S. Appl. No. 15/920,517, Allowed.
U.S. Appl. No. 15/920,538, Allowed.
U.S. Appl. No. 15/920,544, Allowed.
U.S. Appl. No. 16/182,083, Allowed (Continuation of U.S. Appl. No. 15/920,768).
U.S. Appl. No. 15/705,531, Pending.
U.S. Appl. No. 16/232,165, Allowed (Continuation of U.S. Appl. No. 15/854,438).
U.S. Appl. No. 16/100,289, Allowed.
U.S. Appl. No. 15/900,106, Allowed.
U.S. Appl. No. 15/900,141, Allowed.
U.S. Appl. No. 15/900,160, Allowed.
U.S. Appl. No. 15/900,345, Allowed.
U.S. Appl. No. 15/900,379, Allowed.
U.S. Appl. No. 15/920,616, Allowed.
U.S. Appl. No. 15/900,242, Allowed.
U.S. Appl. No. 15/900,334, Allowed.
U.S. Appl. No. 15/920,592, Allowed.
U.S. Appl. No. 16/160,377, Allowed.
U.S. Appl. No. 16/037,564, Pending.
U.S. Appl. No. 16/038,339, Allowed.
U.S. Appl. No. 16/044,574, Allowed.
U.S. Appl. No. 16/184,312, Allowed.
U.S. Appl. No. 16/143,646, Allowed.
U.S. Appl. No. 16/440,161, Pending.
Office Action dated Apr. 26, 2017 which issued during the prosecution of U.S. Appl. No. 15/388,864.
Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jun. 7, 2018 which issued during the prosecution of U.S. Appl. No. 15/380,309.
Office Action dated May 2, 2018, which issued during the prosecution of U.S. Appl. No. 15/280,195.
Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated Jun. 9, 2017 which issued during the prosecution of U.S. Appl. No. 15/388,864.
Office Action dated May 30, 2018 which issued during the prosecution of U.S. Appl. No. 15/388,911.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
"Introduction to TMR Magnetic Sensors", Anonymous, Mar. 12, 2015, MR Sensor Technology, pp. 1-4 (Year: 2015).

(56) References Cited

OTHER PUBLICATIONS

Notice of Allowance dated Apr. 25, 2017 which issued during the prosecution of U.S. Appl. No. 15/072,550.
Notice of Allowance dated Apr. 27, 2017, which issued during the prosecution of U.S. Appl. No. 15/052,115.
Notice of Allowance dated Apr. 5, 2018, which issued during the prosecution of U.S. Appl. No. 14/867,752.
Notice of Allowance dated Aug. 28, 2018 from the US Patent & Trademark Office in U.S. Appl. No. 15/422,821.
Notice of Allowance dated Aug. 30, 2017, which issued during the prosecution of U.S. Appl. No. 15/466,143.
Notice of Allowance dated Aug. 6, 2018, which issued during the prosecution of U.S. Appl. No. 15/920,768.
Notice of Allowance dated Aug. 9, 2018, which issued during the prosecution of U.S. Appl. No. 15/920,563.
Notice of Allowance dated Dec. 2, 2016 which issued during the prosecution of U.S. Appl. No. 14/753,227.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Notice of Allowance dated Feb. 14, 2018, which issued during the prosecution of U.S. Appl. No. 14/870,618.
Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 2, 2017, which issued during the prosecution of U.S. Appl. No. 15/218,190.
Notice of Allowance dated Jun. 28, 2017, which issued during the prosecution of U.S. Appl. No. 15/464,991.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated Mar. 19, 2018, which issued during the prosecution of U.S. Appl. No. 15/378,907.
Notice of Allowance dated Mar. 21, 2018, which issued during the prosecution of U.S. Appl. No. 15/241,286.
Notice of Allowance dated Mar. 21, 2018, which issued during the prosecution of U.S. Appl. No. 15/241,297.
Notice of Allowance dated Mar. 27, 2018, which issued during the prosecution of U.S. Appl. No. 15/241,631.
Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Aug. 27, 2018 in U.S. Appl. No. 15/920,635.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543.
Office Action dated Jan. 31, 2018, which issued during the prosecution of U.S. Appl. No. 14/867,752.
Office Action dated Jul. 3, 2018, which issued during the prosecution of U.S. Appl. No. 15/920,518.
Office Action dated Feb. 28, 2019 in U.S. Appl. No. 15/920,518.
Office Action dated Jul. 6, 2015, which issued during the prosecution of U.S. Appl. No. 14/209,065.
Office Action dated Jul. 6, 2018 from the United States Patent and Trademark Office in U.S. Appl. No. 15/848,173.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated May 4, 2018 which issued during the prosecution of U.S. Appl. No. 15/422,821.
Office Action dated Nov. 28, 2018, which issued during the prosecution of U.S. Appl. No. 15/899,587.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.

(56) References Cited

OTHER PUBLICATIONS

Office Action dated Nov. 8, 2016 from the Japanese Patent Office in Japanese Application No. 2014-199022.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018 from the United States Patent and Trademark Office in U.S. Appl. No. 15/280,195.
Office Action dated Oct. 5, 2017, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723.
Office Action dated Sep. 26, 2017 issued by the Japanese Patent Office in JP Appln. No. 2015-249264.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851.
Office Action dated Apr. 23, 2019 in Japanese Application No. 2016-182230.
Office Action dated Apr. 4, 2019 in U.S. Appl. No. 16/184,312.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,106.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 27, 2018 in U.S. Appl. No. 15/900,334.
Office Action dated Dec. 31, 2018 in U.S. Appl. No. 16/009,603.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 5, 2019 in U.S. Appl. No. 16/038,339.
Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 18, 2019 in U.S. Appl. No. 15/442,961.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 19, 2019 in U.S. Appl. No. 15/443,094.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 6, 2019 in U.S. Appl. No. 15/854,403.
Office Action dated Mar. 7, 2019 in U.S. Appl. No. 15/854,439.
Office Action dated Nov. 14, 2018 in U.S. Appl. No. 16/100,289.
Office Action dated Nov. 19, 2018 in U.S. Appl. No. 15/900,141.
Notice of Allowance dated Mar. 5, 2019 in U.S. Appl. No. 16/009,603.
Office Action dated May 23, 2019 in U.S. Appl. No. 15/388,911.
Notice of Allowance dated May 24, 2019 in U.S. Appl. No. 16/143,646.
Notice of Allowance dated May 24, 2019 in U.S. Appl. No. 15/900,345.
Notice of Allowance dated May 28, 2019 in U.S. Appl. No. 15/920,616.
Notice of Allowance dated May 29, 2019 in U.S. Appl. No. 15/900,334.
Notice of Allowance dated May 29, 2019 in U.S. Appl. No. 15/900,160.
Notice of Allowance dated May 30, 2019 in U.S. Appl. No. 15/900,230.
U.S. Appl. No. 15/280,195, Pending.
U.S. Appl. No. 15/422,944, Allowed.
U.S. Appl. No. 15/619,012, Pending.
U.S. Appl. No. 15/624,897, Pending.
U.S. Appl. No. 15/624,792, Pending.
U.S. Appl. No. 15/626,832, Pending.
U.S. Appl. No. 15/380,336, Pending.
U.S. Appl. No. 15/620,916, Pending.
U.S. Appl. No. 15/626,720, Allowed.
U.S. Appl. No. 15/854,383, Pending.
U.S. Appl. No. 15/854,439, Pending.
U.S. Appl. No. 15/690,400, Pending.
U.S. Appl. No. 15/690,906, Pending.
U.S. Appl. No. 15/627,696, Pending.
U.S. Appl. No. 15/241,286, U.S. Pat. No. 10,026,4331.
U.S. Appl. No. 15/854,438, Allowed.
U.S. Appl. No. 15/854,409, Allowed.
U.S. Appl. No. 15/920,563, Allowed.
U.S. Appl. No. 15/900,144, Pending.
U.S. Appl. No. 15/900,080, Pending.
U.S. Appl. No. 15/920,518, Pending.
U.S. Appl. No. 15/920,768, Allowed.
U.S. Appl. No. 16/009,603, Allowed.
U.S. Appl. No. 16/182,083, Pending (Continuation of U.S. Appl. No. 15/920,768).
U.S. Appl. No. 16/232,165, Pending (Continuation of U.S. Appl. No. 15/854,438).
U.S. Appl. No. 15/900,141, Pending.
U.S. Appl. No. 15/920,592, Pending.
U.S. Appl. No. 16/160,377, Pending.
U.S. Appl. No. 16/184,312, Pending.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.

(56) References Cited

OTHER PUBLICATIONS

Notice of Allowance dated Jun. 25, 2019 in U.S. Appl. No. 15/620,916.
Notice of Allowance dated Jun. 27, 2019 in U.S. Appl. No. 15/854,439.
Notice of Allowance dated Jun. 6, 2019 in U.S. Appl. No. 15/854,383.
Office Action dated Aug. 23, 2019 in U.S. Appl. No. 15/854,409.
Office Action dated Aug. 6, 2019 in Japanese Application No. 2016-254421.
Office Action dated Aug. 6, 2019 in Japanese Application No. 2016-254427.
Office Action dated Jul. 16, 2019 in Japanese Application No. 2016-124933.
Office Action dated Jun. 10, 2019 in U.S. Appl. No. 15/920,518.
Office Action dated Jun. 25, 2019 in Japanese Application No. 2015-245144.
Office Action dated Jun. 6, 2019 in U.S. Appl. No. 15/899,587.
Office Action dated Jan. 28, 2020 in U.S. Appl. No. 15/442,961.
Office Action dated Feb. 21, 2020 in U.S. Appl. No. 16/038,514.
Notice of Allowance dated Feb. 20, 2020 in U.S. Appl. No. 15/705,531.
Notice of Allowance dated Feb. 7, 2020 in U.S. Appl. No. 16/440,161.
Office Action dated Mar. 10, 2020 in U.S. Appl. No. 16/037,596.
Office Action dated Mar. 10, 2020 in U.S. Appl. No. 16/037,681.
Office Action dated Mar. 10, 2020 in U.S. Appl. No. 16/038,545.
Office Action dated Mar. 10, 2020 in U.S. Appl. No. 16/038,687.
Office Action dated Mar. 10, 2020 in U.S. Appl. No. 16/038,771.
Office Action dated Mar. 10, 2020 in U.S. Appl. No. 16/038,847.
Office Action dated Mar. 10, 2020 in U.S. Appl. No. 16/038,884.
Office Action dated Mar. 10, 2020 in U.S. Appl. No. 16/142,560.
Office Action dated Mar. 10, 2020 in U.S. Appl. No. 16/143,747.
Office Action dated Mar. 10, 2020 in U.S. Appl. No. 16/144,428.
Office Action dated Mar. 10, 2020 in U.S. Appl. No. 16/037,573.
Office Action dated Mar. 13, 2020 in U.S. Appl. No. 16/038,669.
Office Action dated Mar. 13, 2020 in U.S. Appl. No. 16/144,605.
Advisory Action dated Jan. 17, 2020 in U.S. Appl. No. 15/443,094.
Office Action dated Nov. 26, 2019 in Japanese Application No. 2016-254421.
Office Action dated Nov. 26, 2019 in Japanese Application No. 2017-029496.
Office Action dated Nov. 26, 2019 in Japanese Application No. 2017-029502.
Office Action dated Nov. 26, 2019 in Japanese Application No. 2017-065694.
Office Action dated Dec. 10, 2019 in Japanese Application No. 2016-254428.
Advisory Action dated Jul. 5, 2018 in U.S. Appl. No. 14/838,663.
Notice of Allowance dated Mar. 14, 2018 in U.S. Appl. No. 15/854,329.
Office Action dated Aug. 25, 2017 in U.S. Appl. No. 14/838,663.
Office Action dated Aug. 27, 2019 in Japanese Application No. 2016-254428.
Office Action dated Aug. 27, 2019 in Japanese Application No. 2016-254430.
Office Action dated Aug. 27, 2019 in Japanese Application No. 2016-254432.
Office Action dated Aug. 28, 2019 in U.S. Appl. No. 15/854,397.
Office Action dated Feb. 11, 2016 in U.S. Appl. No. 14/838,663.
Office Action dated Mar. 30, 2017 in U.S. Appl. No. 14/838,663.
Office Action dated Mar. 5, 2019 in U.S. Appl. No. 15/854,397.
Office Action dated Oct. 1, 2019 in Japanese Application No. 2017-029493.
Office Action dated Oct. 1, 2019 in Japanese Application No. 2017-029494.
Office Action dated Oct. 1, 2019 in Japanese Application No. 2017-029495.
Office Action dated Oct. 12, 2018 in U.S. Appl. No. 15/854,397.
Office Action dated Oct. 2, 2019 in U.S. Appl. No. 15/443,094.
Office Action dated Oct. 8, 2019 in Japanese Application No. 2017-029492.
Office Action dated Oct. 8, 2019 in Japanese Application No. 2017-065678.
Office Action dated Oct. 8, 2019 in Japanese Application No. 2017-065700.
Office Action dated Oct. 8, 2019 in Japanese Application No. 2017-065708.
Office Action dated Sep. 16, 2019 in U.S. Appl. No. 15/854,403.
Office Action dated Sep. 17, 2019 in Japanese Application No. 2017-029499.
Office Action dated Sep. 20, 2019 in U.S. Appl. No. 15/442,961.
Office Action dated Sep. 24, 2019 in Japanese Application No. 2016-254436.
Office Action dated Sep. 24, 2019 in Japanese Application No. 2016-254439.
Office Action dated Sep. 24, 2019 in Japanese Application No. 2016-254441.
Office Action dated Sep. 24, 2019 in Japanese Application No. 2017-029491.
Office Action dated Sep. 24, 2019 in Japanese Application No. 2017-029508.
Office Action dated Sep. 24, 2019 in Japanese Application No. 2017-065730.
Office Action dated Oct. 10, 2019 in U.S. Appl. No. 15/705,531.
Office Action dated Oct. 9, 2019 in U.S. Appl. No. 16/440,161.
Notice of Allowance dated Oct. 17, 2019 in U.S. Appl. No. 15/388,911.
Office Action dated Oct. 22, 2019 in U.S. Appl. No. 16/037,564.
Office Action dated Sep. 12, 2016 in U.S. Appl. No. 14/838,663.
Office Action dated Sep. 3, 2019 in Japanese Application No. 2016-254434.
Office Action dated Sep. 24, 2019 in Japanese Application No. 2016-254450.
Office Action dated Mar. 15, 2018 in U.S. Appl. No. 14/838,663.
Notice of Allowance dated Mar. 18, 2020 in U.S. Appl. No. 16/037,564.
Office Action dated Apr. 29, 2020 in U.S. Appl. No. 16/012,018.
Notice of Allowance dated Aug. 3, 2020 in U.S. Appl. No. 16/038,847.
Notice of Allowance dated Aug. 3, 2020 in U.S. Appl. No. 16/038,884.
Notice of Allowance dated Jul. 23, 2020 in U.S. Appl. No. 16/037,573.
Notice of Allowance dated Jul. 23, 2020 in U.S. Appl. No. 16/038,669.
Notice of Allowance dated Jul. 24, 2020 in U.S. Appl. No. 16/037,596.
Notice of Allowance dated Jul. 27, 2020 in U.S. Appl. No. 16/038,771.
Notice of Allowance dated Jul. 29, 2020 in U.S. Appl. No. 16/037,681.
Notice of Allowance dated Jul. 29, 2020 in U.S. Appl. No. 16/142,560.
Notice of Allowance dated Jul. 29, 2020 in U.S. Appl. No. 16/144,428.
Notice of Allowance dated Jul. 29, 2020 in U.S. Appl. No. 16/144,605.
Notice of Allowance dated Jul. 30, 2020 in U.S. Appl. No. 16/038,545.
Notice of Allowance dated Jul. 30, 2020 in U.S. Appl. No. 16/038,687.
Notice of Allowance dated May 7, 2020 in U.S. Appl. No. 16/038,514.
Office Action dated Jul. 8, 2020 in U.S. Appl. No. 15/442,961.
Office Action dated Dec. 17, 2019 in Japanese Application No. 2017-029507.
Office Action dated Dec. 17, 2019 in Japanese Application No. 2016-254432.
Office Action dated Dec. 17, 2019 in Japanese Application No. 2016-254430.
Office Action dated Dec. 24, 2019 in Japanese Application No. 2017-029510.
Office Action dated Dec. 24, 2019 in Japanese Application No. 2016-254434.
U.S. Appl. No. 15/052,115, U.S. Pat. No. 9,704,527.
U.S. Appl. No. 15/218,190, U.S. Pat. No. 9,721,606.
U.S. Appl. No. 15/280,195, U.S. Pat. No. 10,540,996.
U.S. Appl. No. 15/422,821, U.S. Pat. No. 10,475,481.
U.S. Appl. No. 15/422,944, U.S. Pat. No. 10,347,279.
U.S. Appl. No. 15/466,143, U.S. Pat. No. 9,837,116.
U.S. Appl. No. 15/619,012, U.S. Pat. No. 10,515,660.
U.S. Appl. No. 15/624,897, U.S. Pat. No. 10,510,368.
U.S. Appl. No. 15/624,792, U.S. Pat. No. 10,497,388.
U.S. Appl. No. 15/626,832, U.S. Pat. No. 10,510,370.
U.S. Appl. No. 15/625,428, U.S. Pat. No. 10,403,318.
U.S. Appl. No. 14/978,834, U.S. Pat. No. 9,721,605.
U.S. Appl. No. 14/757,555, U.S. Pat. No. 9,711,174.

(56) References Cited

OTHER PUBLICATIONS

U.S. Appl. No. 15/197,046, U.S. Pat. No. 9,721,607.
U.S. Appl. No. 15/380,336, U.S. Pat. No. 10,522,180.
U.S. Appl. No. 15/614,876, U.S. Pat. No. 10,431,248.
U.S. Appl. No. 15/620,916, U.S. Pat. No. 10,477,072.
U.S. Appl. No. 15/621,464, U.S. Pat. No. 10,431,249.
U.S. Appl. No. 15/626,720, U.S. Pat. No. 10,347,280.
U.S. Appl. No. 15/854,383, U.S. Pat. No. 10,438,628.
U.S. Appl. No. 15/854,507, U.S. Pat. No. 9,984,716.
U.S. Appl. No. 15/854,439, U.S. Pat. No. 10,482,915.
U.S. Appl. No. 15/854,506, U.S. Pat. No. 10,008,230.
U.S. Appl. No. 15/848,173, U.S. Pat. No. 10,403,320.
U.S. Appl. No. 15/628,814, U.S. Pat. No. 10,504,546.
U.S. Appl. No. 15/690,400, U.S. Pat. No. 10,529,368.
U.S. Appl. No. 15/690,906, U.S. Pat. No. 10,522,179.
U.S. Appl. No. 15/626,355, U.S. Pat. No. 10,510,369.
U.S. Appl. No. 15/627,696, U.S. Pat. No. 10,522,171.
U.S. Appl. No. 14/870,618, U.S. Pat. No. 9,959,894.
U.S. Appl. No. 15/388,911, U.S. Pat. No. 10,573,341.
U.S. Appl. No. 14/753,227, U.S. Pat. No. 9,601,146.
U.S. Appl. No. 15/380,309, U.S. Pat. No. 10,403,319.
U.S. Appl. No. 15/388,864, U.S. Pat. No. 9,773,519.
U.S. Appl. No. 15/072,550, U.S. Pat. No. 9,704,525.
U.S. Appl. No. 15/615,871, U.S. Pat. No. 10,074,393.
U.S. Appl. No. 15/854,410, U.S. Pat. No. 9,972,351.
U.S. Appl. No. 15/378,907, U.S. Pat. No. 9,984,710.
U.S. Appl. No. 15/241,631, U.S. Pat. No. 10,026,435.
U.S. Appl. No. 14/209,065, U.S. Pat. No. 9,530,444.
U.S. Appl. No. 15/854,474, U.S. Pat. No. 9,978,414.
U.S. Appl. No. 15/854,403, Pending.
U.S. Appl. No. 15/241,297, U.S. Pat. No. 10,026,434.
U.S. Appl. No. 15/241,286, U.S. Pat. No. 10,026,433.
U.S. Appl. No. 15/464,991, U.S. Pat. No. 9,779,772.
U.S. Appl. No. 14/867,752, U.S. Pat. No. 10,026,430.
U.S. Appl. No. 15/854,438, U.S. Pat. No. 10,373,633.
U.S. Appl. No. 15/854,409, Abandoned.
U.S. Appl. No. 15/443,026 (the present Application), Pending.
U.S. Appl. No. 15/920,782, U.S. Pat. No. 10,134,433.
U.S. Appl. No. 15/920,563, U.S. Pat. No. 10,360,937.
U.S. Appl. No. 15/920,533, U.S. Pat. No. 10,431,251.
U.S. Appl. No. 15/900,144, U.S. Pat. No. 10,497,384.
U.S. Appl. No. 15/900,080, U.S. Pat. No. 10,460,756.
U.S. Appl. No. 15/900,230, U.S. Pat. No. 10,431,250.
U.S. Appl. No. 15/900,164, U.S. Pat. No. 10,424,330.
U.S. Appl. No. 15/920,518, U.S. Pat. No. 10,546,605.
U.S. Appl. No. 15/899,587, U.S. Pat. No. 10,546,602.
U.S. Appl. No. 15/899,430, U.S. Pat. No. 10,403,314.
U.S. Appl. No. 15/920,515, U.S. Pat. No. 10,410,665.
U.S. Appl. No. 15/920,517, U.S. Pat. No. 10,395,685.
U.S. Appl. No. 15/920,538, U.S. Pat. No. 10,403,317.
U.S. Appl. No. 15/920,544, U.S. Pat. No. 10,410,666.
U.S. Appl. No. 15/920,768, U.S. Pat. No. 10,373,639.
U.S. Appl. No. 16/009,603, U.S. Pat. No. 10,366,721.
U.S. Appl. No. 16/182,083, U.S. Pat. No. 10,515,661.
U.S. Appl. No. 15/705,531, Allowed.
U.S. Appl. No. 16/232,165, U.S. Pat. No. 10,510,366.
U.S. Appl. No. 16/100,289, U.S. Pat. No. 10,497,389.
U.S. Appl. No. 16/038,669, Pending.
U.S. Appl. No. 15/900,106, U.S. Pat. No. 10,438,624.
U.S. Appl. No. 15/900,412, U.S. Pat. No. 10,062,403.
U.S. Appl. No. 15/900,141, U.S. Pat. No. 10,573,338.
U.S. Appl. No. 15/900,160, U.S. Pat. No. 10,438,625.
U.S. Appl. No. 15/900,345, U.S. Pat. No. 10,482,913.
U.S. Appl. No. 15/900,379, U.S. Pat. No. 10,453,488.
U.S. Appl. No. 16/012,018, Pending.
U.S. Appl. No. 15/920,616, U.S. Pat. No. 10,438,623.
U.S. Appl. No. 15/900,242, U.S. Pat. No. 10,475,480.
U.S. Appl. No. 15/900,334, U.S. Pat. No. 10,438,621.
U.S. Appl. No. 15/920,592, U.S. Pat. No. 10,403,312.
U.S. Appl. No. 15/920,635, U.S. Pat. No. 10,170,144.
U.S. Appl. No. 16/160,377, U.S. Pat. No. 10,490,220.
U.S. Appl. No. 15/443,094, Pending.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Allowed.
U.S. Appl. No. 16/038,339, U.S. Pat. No. 10,403,316.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, U.S. Pat. No. 10,438,622.
U.S. Appl. No. 16/142,560, Pending.
U.S. Appl. No. 16/184,312, U.S. Pat. No. 10,497,386.
U.S. Appl. No. 16/143,646, U.S. Pat. No. 10,515,657.
U.S. Appl. No. 16/144,428, Pending.
U.S. Appl. No. 16/143,747, Pending.
U.S. Appl. No. 16/440,161, Allowed.
U.S. Appl. No. 16/144,605, Pending.
U.S. Appl. No. 15/854,397, Abandoned.
U.S. Appl. No. 15/854,329, U.S. Pat. No. 9,984,712.
U.S. Appl. No. 14/838,663, Abandoned.
Notice of Allowance dated Sep. 17, 2020 in U.S. Appl. No. 16/012,018.
Notice of Allowance dated Sep. 23, 2020 in U.S. Appl. No. 15/443,094.

* cited by examiner

MAGNETIC TAPE

CROSS-REFERENCE TO RELATED APPLICATIONS

This application claims priority under 35 U.S.C 119 to Japanese Patent Application No. 2016-037569 filed on Feb. 29, 2016. The above application is hereby expressly incorporated by reference, in its entirety.

BACKGROUND OF THE INVENTION

Field of the Invention

The present invention relates to a magnetic tape.

Discussion of the Background

Magnetic recording media include tape-shaped media and disk-shaped media. Magnetic recording media in the form of tapes, that is, magnetic tapes, are primarily employed in data storage applications such as data-backup tapes. To record and reproduce signals on a magnetic tape, the magnetic tape is normally run within a drive and the magnetic layer surface of the magnetic tape and the magnetic head (also referred to hereinafter simply as a "head") are brought into contact to slide.

Improvements in electromagnetic characteristics are constantly being sought in the magnetic recording field. In this regard, for example, Japanese Unexamined Patent Publication (KOKAI) No. 2010-49731, which is expressly incorporated herein by reference in its entirety, describes increasing the smoothness of the surface of the magnetic layer to obtain a magnetic recording medium affording good electromagnetic characteristics (for example, see Japanese Unexamined Patent Publication (KOKAI) No. 2010-49731, paragraphs 0020 and 0178).

SUMMARY OF THE INVENTION

As described in Japanese Unexamined Patent Publication (KOKAD No. 2010-49731, it is possible to enhance electromagnetic characteristics by increasing the smoothness of the surface of the magnetic layer. This is because smoothing the surface of the magnetic layer makes it possible to narrow the gap (spacing) between the surface of the magnetic layer and the head.

However, foreign material is generated by, for example, shaving off of portions of the surface of the magnetic layer, which then adhere to the head, when the surface of the magnetic layer slides against the head during the running of a magnetic tape. When the surface of the magnetic layer slides repeatedly against a head on which foreign material has adhered, the spacing between the surface of the magnetic layer and the head is affected by the foreign material and the output sometimes fluctuates. Such output fluctuation, known as spacing loss, causes a drop in electromagnetic characteristics with repeated sliding of the surface of the magnetic layer against the head. As a result, even if good electromagnetic characteristics were to be achieved in initial running by increasing the smoothness of the surface of the magnetic layer, the phenomenon of a drop in electromagnetic characteristics would occur with repeated running.

Conventionally, abrasives have come to be incorporated into the magnetic layer to impart to the surface of the magnetic layer a function of removing foreign material that has adhered to the head (for example, see Japanese Unexamined Patent Publication (KOKAI) 2010-49731, paragraph 0086). The function of the surface of the magnetic layer in removing foreign material that has adhered to the head will be described hereinafter as "magnetic layer surface abrasiveness" or simply "abrasiveness". Imparting abrasiveness to the surface of the magnetic layer by means of abrasives makes it possible for a magnetic tape to exhibit good electromagnetic characteristics even with repeated sliding of the surface of the magnetic layer against the head.

Various environments are envisioned for the use of magnetic tapes employed in data storage applications. They are often employed at low humidity (such as at relative humidity levels of about 10% to 30%). Accordingly, it is desirable for a magnetic tape to be able to maintain abrasiveness at low humidity. However, as a result of research, the present inventors have discovered that in magnetic tapes with a magnetic layer of high surface smoothness, a phenomenon occurs whereby the abrasiveness of the surface of the magnetic layer ends up decreasing with repeated running at low humidity.

An aspect of the present invention provides for a magnetic tape with a magnetic layer of high surface smoothness in which a drop in the abrasiveness of the surface of the magnetic layer with repeated running at low humidity can be inhibited.

An aspect of the present invention relates to:

A magnetic tape having a magnetic layer containing ferromagnetic powder, abrasive, and binder on a nonmagnetic support, wherein:

the centerline average surface roughness Ra measured on the surface of the magnetic layer is less than or equal to 1.8 nm;

the contact angle for 1-bromonaphthalene that is measured on the surface of the magnetic layer falls within a range of 45.0° to 60.0°; and the coefficient of friction that is measured on the base portion of the surface of the magnetic layer is less than or equal to 0.35.

The above magnetic tape was found to be capable of inhibiting a drop in the abrasiveness of the surface of the magnetic layer with repeated running at low humidity despite the high surface smoothness of the magnetic layer (specifically, a centerline average surface roughness Ra of less than or equal to 1.8 nm).

In the present invention and the present specification, the "centerline average surface roughness Ra measured on the surface of the magnetic layer of the magnetic tape" (also referred to hereinafter as the "magnetic layer surface Ra") is a value measured for an area of 40 µm×40 µm with an atomic force microscope (AFM). The measurement conditions set forth below are an example of the measurement conditions. The centerline average surface roughness Ra in Examples set forth further below are values obtained by measurement under the following measurement conditions. In the present invention and present specification, the term "surface of the magnetic layer" of the magnetic tape is synonymous with the surface of the magnetic tape on the magnetic layer side.

An area of 40 µm×40 µm of the surface of the magnetic tape is measured on the magnetic layer side with an AFM (Nanoscope 4 made by Veeco Corp.). The scan rate (probe displacement rate) is 40 µm/s and the resolution is 512 pixels×512 pixels.

The "contact angle for 1-bromonaphthalene" is also referred to as the "1-bromonaphthalene contact angle" below. The "contact angle for water" referred to further below is also referred to as the "water contact angle." The 1-bromonaphthalene contact angle and the water contact angle are evaluated by the drop method. Specifically, the "contact angle" refers to the arithmetic average of values obtained by conducting six measurements of a given sample by the θ/2 method in a measurement environment of an atmospheric temperature of 25° C. and 25% relative humidity. Examples of specific measurement conditions will be set forth further below in Examples.

The "base portion" as referred to in the present invention is the portion of the surface of the magnetic layer of the magnetic tape specified by the following method.

Defining the plane where the volumes of protruding components and indenting components equal out in the field of view as measured by an atomic force microscope (AFM) as the reference plane, protrusions are defined as protrusions greater than or equal to 15 nm in height from the reference plane. The portion where the number of protrusions greater than or equal to 15 nm in height from the reference plane is zero, that is, the portion where no protrusions greater than or equal to 15 nm in height from the reference plane are detected on the surface of the magnetic layer, is specified as the base portion.

The coefficient of friction that is measured on the base portion refers to the value that is measured by the following method.

On the base portion (measurement spot: a 10 m length in the longitudinal direction of a magnetic tape), a spherical indenter made of diamond that is 1 m in radius is passed back and forth once at a load of 100 μN and at a speed of 1 μn/sec. to measure the frictional force (horizontal force) and normal force. The frictional force and normal force that are measured are arithmetic averages obtained by constantly measuring the frictional force and normal force during one back and forth pass. This measurement can be conducted, for example, with a model TI-95 Triboindenter made by Hysitron Corp. The pt value of the coefficient of friction is calculated from the arithmetic average of the frictional force and the arithmetic average of the normal force that are measured. The coefficient of friction is a value that is obtained from the equation: $F=\mu N$ from the frictional force (horizontal force) F (unit: Newtons (N)) and the normal force N (unit: Newtons (N)). The above measurement and calculation of coefficient of friction μ value is conducted for three portions of the base portion randomly determined on the surface of the magnetic layer of the magnetic tape and the arithmetic average of the three measured values obtained is adopted as the coefficient of friction measured on the base portion. The coefficient of friction measured on the base portion will also be referred to as the "base portion friction" below.

In one embodiment, the centerline average surface roughness Ra falls within a range of 1.2 nm to 1.8 nm.

In one embodiment, the centerline average surface roughness Ra falls within a range of 1.2 nm to 1.6 nm.

In one embodiment, the base portion friction falls within a range of 0.15 to 0.35.

In one embodiment, the contact angle for water measured on the surface of the magnetic layer (water contact angle) falls within a range of 90.0° to 100.0°.

In one embodiment, the magnetic layer further contains one or more lubricants selected from the group consisting of fatty acids, fatty acid esters, and fatty acid amides.

In one embodiment, the magnetic layer further contains a nitrogen-containing polymer. In the present invention and the present specification, the term "polymer" is used to mean a polymer comprised of a plurality of repeating units that are identical or different, including homopolymers and copolymers.

In one embodiment, the above nitrogen-containing polymer is a polyalkyleneimine polymer.

In one embodiment, the above polyalkyleneimine polymer is a polymer that contains a polyalkyleneimine chain and a polyester chain.

In one embodiment, the above magnetic tape has a nonmagnetic layer containing nonmagnetic powder and binder between the nonmagnetic support and the magnetic layer.

In one embodiment, the above magnetic tape has a backcoat layer containing nonmagnetic powder and binder on the opposite side of the nonmagnetic support from that on which the magnetic layer is present.

An aspect of the present invention can provide a magnetic tape in which the surface of the magnetic layer is highly smooth and that is capable of inhibiting a drop in the abrasiveness of the surface of the magnetic layer with repeated running at low humidity.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

The magnetic tape of an aspect of the present invention is a magnetic tape having a magnetic layer containing ferromagnetic powder, abrasive, and binder on a nonmagnetic support, wherein the centerline average surface roughness Ra measured on the surface of the magnetic layer (magnetic layer surface Ra) is less than or equal to 1.8 nm; the contact angle for 1-bromonaphthalene that is measured on the surface of the magnetic layer (1-bromonaphthalene contact angle) falls within a range of 45.0° to 60.0°; and the coefficient of friction that is measured on the base portion of the surface of the magnetic layer (base portion friction) is less than or equal to 0.35.

Although not limiting the present invention in any way, the present inventors presume that (1) and (2) below are the reasons for which the above magnetic tape is able to inhibit a drop in the abrasiveness of the surface of the magnetic layer even with repeated running at low humidity despite the highly smooth surface of the magnetic layer (a magnetic layer surface Ra of less than or equal to 1.8 nm).

(1) The drop in abrasiveness of the surface of the magnetic layer is presumed to occur in part because the abrasive that is present in the vicinity of the surface of the magnetic layer is shaved off and ends up being worn away due to contact with the head with repeated sliding of the surface of the magnetic layer against the head at low humidity. The occurrence of this wearing away of abrasive is presumed to tend to increase with the application of a large force on the abrasive the poorer the sliding property of the surface of the magnetic layer against the head becomes (the more difficult smooth sliding becomes). On the surface of a magnetic layer with a magnetic layer surface Ra of less than or equal to 1.8 nm, the probability of the head contacting the base portion during sliding against the head is thought to be higher than with a coarser magnetic layer surface. Accordingly, the present inventors presume that the effect of the base portion friction on the sliding property would increase. Keeping the base portion friction to less than or equal to 0.35 is presumed by the present inventors to contribute to enhancing the sliding property of the surface of a magnetic layer with a magnetic layer surface Ra of less than or equal to 1.8 nm against the head, thereby making it possible to inhibit wearing away of the abrasive.

(2) Additionally, when the state of contact between the surface of the magnetic layer and the head is unstable during sliding of the surface of the magnetic layer against the head, the abrasiveness of the surface of the magnetic layer is presumed not to be properly utilized. The present inventors also presume this to be one cause of the drop in the abrasiveness of the surface of the magnetic layer.

In this regard, the present inventors conducted extensive research in which they focused on the 1-bromonaphthalene contact angle. The details are as follows. The present inventors presumed that the affinity of the surface of the magnetic layer and the head contributed to the state of contact between the surface of the magnetic layer and the head, and that this affinity was affected by the surface free energy of the surface of the magnetic layer. They thus conducted an examination based on the Kitazaki-Hata theory (three liquid method), which is a known theory relating to surface free energy. The surface free energy calculated by the three-liquid method is obtained as the sum of a dispersion component, hydrogen-bonding component, and polar component. However, the dispersion component due to the physical properties of the constituent components of the magnetic layer is thought to be dominant in the surface free energy that is measured on the surface of the magnetic layer of a particulate magnetic tape such as the above magnetic tape. Accordingly, the dispersion component was presumed to primarily contribute to the affinity of the surface of the magnetic layer of the magnetic tape and the head. Accordingly, the present inventors conducted extensive research into controlling the surface state of the magnetic layer based on an indicator of the dispersion component. As a result, they adopted the 1-bromonaphthalene contact angle. This resulted from focusing on the fact that the dispersion component of 1-bromonaphthalene also dominated the surface free energy. The present inventors then further examined controlling the surface state of the magnetic layer based on the 1-bromonaphthalene contact angle. As a result, they discovered that keeping the 1-bromonaphthalene contact angle within a range of 45.0° to 60.0° could contribute to being able to inhibit the drop in the abrasiveness of the surface of the magnetic layer even with repeated running at low humidity. The present inventors presume that a magnetic layer surface the 1-bromonaphthalene contact angle of which falls within the above range can have a suitable affinity for the head, and as a result, is able to come into stable contact with the head during sliding against the head.

The present invention was devised based on the above knowledge. However, the above contains presumptions by the present inventors and does not limit the present invention in any way.

The above magnetic tape will be described in greater detail below.

[Magnetic Layer Surface Ra]

The centerline average surface roughness Ra that is measured on the surface of the magnetic layer of the above magnetic tape (magnetic layer surface Ra) is less than or equal to 1.8 nm. Thus, the above magnetic tape is able to exhibit good electromagnetic characteristics. However, if no countermeasures are adopted in a magnetic tape the magnetic layer surface Ra of which is less than or equal to 1.8 nm, the phenomenon of a drop in the abrasiveness of the surface of the magnetic layer with repeated running at low humidity will end up occurring. By contrast, in the above magnetic tape in which the base portion friction and 1-bromonaphthalene contact angle fall within the respective ranges set forth above, it is possible to inhibit a drop in the abrasiveness of the magnetic layer surface even with repeated running at low humidity despite the magnetic layer surface Ra being less than or equal to 1.8 nm. In this regard, the present inventors presume that, as set forth above, from the perspective of further enhancing the electromagnetic characteristics, the magnetic layer surface Ra is desirably less than or equal to 1.7 nm, preferably less than or equal to 1.6 nm, and more preferably, less than or equal to 1.5 nm. Further, for example, the magnetic layer surface Ra can be greater than or equal to 1.2 nm. However, from the perspective of enhancing the electromagnetic characteristics, the lower the magnetic layer surface Ra is the better. Thus, a value lower than the value given above by way of example is also possible.

The magnetic layer surface Ra can be controlled by known methods. For example, the magnetic layer surface Ra changes based on the size of the various powders contained in the magnetic layer (for example, the ferromagnetic powder, abrasive, and other optionally contained nonmagnetic powder) and the magnetic tape manufacturing conditions. Thus, these can be adjusted to obtain a magnetic tape with a magnetic layer surface Ra of less than or equal to 1.8 nm.

[Base Portion Friction]

The coefficient of friction measured on the base portion of the surface of the magnetic layer of the above magnetic tape (base portion friction) is less than or equal to 0.35. As set forth above, the fact that the base portion friction is less than or equal to 0.35 is presumed by the present inventors to make it possible to inhibit a drop in the abrasiveness of the surface of the magnetic layer even with repeated running at low humidity. From the perspective of further inhibiting the drop in the abrasiveness of the surface of the magnetic layer with repeated running at low humidity, the base portion friction is desirably less than or equal to 0.33, preferably less than or equal to 0.30. The base portion friction, for example, can be greater than or equal to 0.10, greater than or equal to 0.15, or greater than or equal to 0.20. However, from the perspective of inhibiting the drop in abrasiveness of the surface of the magnetic layer with repeated running at low humidity, the lower the base portion friction is the better. Thus, a value lower than the values given above by way of example is also possible.

The reason protrusions that are greater than or equal to 15 nm in height above the reference plane are defined as protrusions in the above method of measuring the base portion friction is that the protrusions that are identified as protrusions present on the surface of the magnetic layer are normally protrusions that are greater than or equal to 15 nm in height above the reference plane. Such protrusions can be formed on the surface of the magnetic layer, for example, with nonmagnetic powder such as an abrasive and the like. By contrast, the present inventors presume that irregularities that are more microscopic than the irregularities that are formed by such protrusions are present on the surface of the magnetic layer. The present inventors also presume that the base portion friction can be adjusted by controlling the shape of these microscopic irregularities. Based on this presumption, the present inventors formed a magnetic layer using two or more kinds of ferromagnetic powder with different average particle sizes to control the shape of the irregularities of the base portion. As a result, it was possible to control the base portion friction to various values. Accordingly, an example of one way of adjusting the base portion friction is to use two or more kinds of ferromagnetic powder with different average particle sizes as ferromagnetic powder. More specifically, the present inventors presume that it is possible to form the above microscopic irregularities on the base portion by means of protrusions in the form of ferromagnetic powder of large average particle size, and that it is possible to increase the abundance of protrusions on the base portion by increasing the mixing ratio of ferromagnetic powder of larger average particle size (and conversely, to lower the abundance of protrusions on the base portion by decreasing the mixing ratio). This will be described in greater detail further below.

As another way, the present inventors formed a magnetic layer using additional nonmagnetic powder with an average particle size greater than that of the ferromagnetic powder together with the nonmagnetic powder, such as abrasive, capable of forming protrusions having a height of greater than or equal to 15 nm from the reference surface on the surface of the magnetic layer to control the shape of irregularities on the base portion. It was thus possible to control the base portion friction to various values. Accordingly, another example of a way of adjusting the base portion friction is to use this additional nonmagnetic powder when forming the magnetic layer. More specifically, the present inventors presume that the additional nonmagnetic powder becomes protrusions that form the above microscopic irregularities on the base portion, and that by increasing the mixing ratio of such nonmagnetic powder, it is possible to increase the abundance of protrusions on the base portion (and conversely, to lower the abundance of protrusions on the base portion by decreasing the mixing ratio). This will be described in greater detail further below.

Additionally, it is possible to adjust the base portion friction by combining the above two methods.

However, the above adjustment methods are examples. Any means of adjustment can be used to achieve a base portion friction of less than or equal to 0.35, and such embodiments are included in the present invention.

[1-Bromonaphthalene Contact Angle]

The 1-bromonaphthalene contact angle measured on the surface of the magnetic layer of the above magnetic tape falls within a range of 45.0° to 60.0°. The present inventors presume that the lower the value of the 1-bromonaphthalene contact angle, the greater the affinity of the surface of the magnetic layer and the head, and the higher the value, the lower the affinity of the surface of the magnetic layer and the head. It is presumed that a magnetic layer surface exhibiting a 1-bromonaphthalene contact angle falling within a range of 45.0° to 60.0° can exhibit suitable affinity with the head during sliding with the head, making it possible to achieve a stable contact state and thus good abrasiveness of the surface of the magnetic layer. From the perspective of further inhibiting the drop in the abrasiveness of the surface of the magnetic layer with repeated running at low humidity, the 1-bromonaphthalene contact angle that is measured on the surface of the magnetic layer is desirably greater than or equal to 48.0°, preferably greater than or equal to 50.0°. From the same perspective, the 1-bromonaphthalene contact angle is desirably less than or equal to 58.0°, preferably less than or equal to 55.0°.

The 1-bromonaphthalene contact angle that is measured on the surface of the magnetic layer can be controlled by using components that permit adjusting of the 1-bromonaphthalene contact angle (also referred to hereinafter as "1-bromonapthalene contact angle-adjusting components" or "contact angle-adjusting components") and adjusting the content of such components. For example, a component that is able to produce an effect of increasing the value of the 1-bromonaphthalene contact angle can be used as a 1-bromonaphthalene contact angle-adjusting component and the content of this component can be increased to increase the value of the 1-bromonaphthalene contact angle.

Lubricants are an example of 1-bromonaphthalene contact angle-adjusting components. The polymers described in detail further below are further examples. For example, a magnetic layer in which the 1-bromonaphthalene contact angle that is measured on the surface falls within a range of 45.0° to 60.0° can be formed using one or more 1-bromonaphthalene contact angle-adjusting components selected from the group consisting of lubricants and the polymers described further below. In one embodiment, one or more lubricants can be employed as 1-bromonaphthalene contact angle-adjusting components to form a magnetic layer without employing the polymers described further below. In another embodiment, one or more of the polymers described further below can be employed as 1-bromonaphthalene contact angle-adjusting components to form a magnetic layer without employing lubricants. In still another embodiment, one or more lubricants and one or more of the polymers described further below can be employed in combination as 1-bromonaphthalene contact angle-adjusting agents to form a magnetic layer. At least one of the polymers described further below is desirably used to form a magnetic layer. This is because the content of lubricant in the magnetic layer may sometimes increase when the 1-bromonaphthalene contact angle is controlled within the above range by using just a lubricant. When the content of lubricant in the magnetic layer increases, lubricant tends to transfer from the surface of the magnetic layer to the head during sliding of the surface of the magnetic layer against the head, tending to adhere primarily to the edge portions of the contact surface of the head with the surface of the magnetic layer. Since there may also be cases where the lubricant that has adhered to the head imparts spacing loss in this manner, from the perspective of further enhancing the electromagnetic characteristics, it is desirable to inhibit adhesion of the lubricant to the head. To this end, it is desirable to use at least one of the polymers described further below to form the magnetic layer.

[Water Contact Angle]

Based on research by the present inventors into the above, the contact angle for water that is measured on the surface of the magnetic layer (water contact angle) can exhibit a correlation with the content of lubricant in the magnetic layer. The more the content of lubricant was increased, the greater the value of the water contact angle that tended to be seen. From the perspective of inhibiting adhesion of lubricant to the head, the water contact angle that is measured on the surface of the magnetic layer is desirably less than or equal to 100.0°, preferably less than or equal to 99.5°, and more preferably, less than or equal to 99.0°. From the perspective of improving the sliding property of the surface of the magnetic layer against the head, the water contact angle that is measured on the surface of the magnetic layer is desirably greater than or equal to 90.0°, preferably greater than or equal to 93.0°, and more preferably, greater than or equal to 95.0°. The water contact angle can be adjusted by means of the content of lubricant in the magnetic layer.

[1-Bromonaphthalene Contact Angle-Adjusting Component]

The 1-bromonaphthalene contact angle-adjusting component is a component that is capable of adjusting the 1-bromonaphthalene contact angle that is measured on the surface of the magnetic layer. Here, the term "capable of adjusting" means capable of exhibiting an effect that changes the 1-bromonaphthalene contact angle. The fact of exhibiting such an effect can be recognized by determining whether the presence of a 1-bromonaphthalene contact angle-adjusting component changes the 1-bromonaphthalene contact angle that is measured on the surface of the magnetic layer. The 1-bromonaphthalene contact angle-adjusting component desirably exhibits an effect of increasing the value of the 1-bromonaphthalene contact angle. One form of a 1-bromonaphthalene contact angle-adjusting component is a lubricant; other forms are polymers that will be described in detail further below. These components will be sequentially described below.

<Lubricant>

Examples of the lubricant are various lubricants commonly employed in magnetic recording media, such as fatty acids, fatty acid esters, and fatty acid amides.

Examples of fatty acids are lauric acid, myristic acid, palmitic acid, steric acid, oleic acid, linoleic acid, linolenic acid, behenic acid, erucic acid, and elaidic acid. Stearic acid, myristic acid, and palmitic acid are desirable, and stearic acid is preferred. Fatty acids can also be incorporated into the magnetic layer in the form of salts such as metal salts.

Examples of fatty acid esters are esters of each of the above fatty acids, such as butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

Examples of fatty acid amides are amides of each of the above fatty acids, such as amide laurate, amide myristate, amide palmitate, and amide stearate.

The fatty acid content is, for example, 0 to 10.0 weight parts, desirably 0.1 to 10.0 weight parts, preferably 0.5 to 8.0 weight parts, and more preferably, 1.0 to 7.0 weight parts per 100.0 weight parts of ferromagnetic powder in the magnetic layer-forming composition. When two or more different fatty acids are employed as fatty acids, the content refers to the combined content thereof. The same applies to other components, as well. That is, in the present invention and present application, unless specifically stated otherwise, one or more types of a given component can be employed. When two or more types of a given component are employed, unless specifically stated otherwise, the content of the component refers to the combined content of the two or more types.

The fatty acid ester content, as the fatty acid ester content of the magnetic layer-forming composition, is, for example, 0.1 to 10.0 weight parts, desirably 0.5 to 8.0 weight parts, and preferably, 1.0 to 7.0 weight parts per 100.0 weight parts of ferromagnetic powder.

The fatty acid amide content is, for example, 0 to 3.0 weight parts, desirably 0 to 2.0 weight parts, and preferably, 0 to 1.0 weight parts per 100.0 weight parts of ferromagnetic powder in the magnetic layer-forming composition.

When a nonmagnetic layer is present between the nonmagnetic support and the magnetic layer in the above magnetic tape, lubricant can be contained, or not contained, in the nonmagnetic layer. At least a portion of the lubricant that is contained in the nonmagnetic layer will usually migrate to the magnetic layer side and be present in the magnetic layer. The fatty acid content in the nonmagnetic layer-forming composition is, for example, 0 to 10.0 weight parts, desirably 1.0 to 10.0 weight parts, and preferably, 1.0 to 7.0 weight parts per 100.0 weight parts of nonmagnetic powder. The fatty acid ester content is, for example, 0 to 10.0 weight parts, desirably 0.1 to 8.0 weight parts per 100.0 weight parts of nonmagnetic powder. The fatty acid amide content in the nonmagnetic layer-forming composition is, for example, 0 to 3.0 weight parts, desirably 0 to 1.0 weight parts per 100.0 weight parts of nonmagnetic powder.

It is desirable to employ a fatty acid in combination with one or more fatty acid derivative. It is preferable to employ a fatty acid in combination with one or more selected from the group consisting of fatty acid esters and fatty acid amides. And it is of greater preference to employ a fatty acid in combination with a fatty acid ester and a fatty acid amide.

When employing a fatty acid in combination with a fatty acid derivative (ester, amide, or the like), the fatty acid-derived moiety of the fatty acid derivative desirably has the same structure or one similar to that of the fatty acid with which it is being employed. As an example, when employing stearic acid as a fatty acid, it is desirable to employ a stearic acid ester and/or amide stearate.

The lubricant described in Japanese Unexamined Patent Publication (KOKAI) No. 2009-96798, paragraph 0111 can be employed. The content of the above publication is expressly incorporated herein by reference in its entirety Incorporating a lubricant into the magnetic layer tends to increase the value of the 1-bromonaphthalene contact angle that is measured on the surface of the magnetic layer. However, as set forth above, from the perspective of inhibiting the adhesion of lubricant to the head, it is desirable to incorporate the polymers set forth below as 1-bromonaphthalene contact angle-adjusting components into the magnetic layer along with optional lubricants.

<Nitrogen-Containing Polymer>

An example of one form of a 1-bromonaphthalene content-adjusting component is a nitrogen-containing polymer. The present inventors presume that the polymer chain contained in a nitrogen-containing polymer can contribute to increasing the 1-bromonaphthalene contact angle measured on the surface of the magnetic layer.

The term "nitrogen-containing polymer" refers to a polymer containing nitrogen atoms in the structure thereof. Examples of desirable nitrogen-containing polymers are amine polymers in the form of polyalkyleneimine polymers and amine polymers other than polyalkyleneimine polymers.

In one embodiment, the nitrogen-containing polymer is desirably a polymer the weight average molecular weight of which falls within a range that is not greater than the weight average molecular weight of the binder contained in the magnetic layer. For example, the weight average molecular weight of the above nitrogen-containing polymer can be less than or equal to 80,000, less than or equal to 60,000, less than or equal to 40,000, less than or equal to 35,000, less than or equal to 30,000, less than or equal to 20,000, or less than or equal to 10,000. Further, the weight average molecular weight can be, for example, greater than or equal to 1,000, greater than or equal to 1,500, greater than or equal to 2,000, or greater than or equal to 3,000. Unless specifically stated otherwise, the term "weight average molecular weight" as referred to in the present invention and present specification is a value measured by gel permeation chromatography (GPC) under the following measurement conditions and converted to a polystyrene equivalent.

GPC value: HLC-8120 (made by Tosoh Corp.)
Column: TSK gel Multipore HXL-M (7.8 mm inner diameter (ID)×30.0 cm, made by Tosoh Corp.)
Eluent: Tetrahydrofuran (THF)
Desirable polyalkyleneimine polymers are described below.
<Polyalkyleneimine Polymer>
(Polyalkyleneimine Chain)

The term "polyalkyleneimine polymer" refers to a polymer containing one or more polyalkyleneimine chains. In one embodiment, it is presumed that the polyalkyleneimine chain can function as a moiety adsorbing to the ferromagnetic powder in the magnetic layer. The term "polyalkyleneimine chain" refers to a polymerization structure containing two or more identical or different alkyleneimine chains. Examples of the alkyleneimine chains that are contained are the alkyleneimine chain denoted by formula A below and the alkyleneimine chain denoted by formula B below. Among the alkyleneimine chains denoted by the formulas given below, the alkyleneimine chain denoted by formula A can contain a bond position with another polymer chain. The alkyleneimine chain denoted by formula B can be bonded by means of a salt crosslinking group (described in greater detail further below) to another polymer chain. The polyalkyleneimine chain can have only a linear structure, or can have a branched tertiary amine structure. Examples comprising branched structures are ones where the alkyleneimine chain is bonded to an adjacent alkyleneimine chain at *$^1$ in formula A below and where it is bonded to the adjacent alkyleneimine chain at *$^2$ in formula B below.

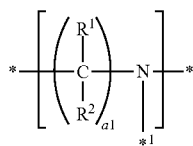

Formula A

In formula A, each of $R^1$ and $R^2$ independently denotes a hydrogen atom or an alkyl group; a1 denotes an integer of equal to or greater than 2; and *$^1$ denotes the site of a bond with an adjacent another polymer chain (such as a polyester chain, an adjacent alkyleneimine chain set forth below), or a hydrogen atom or a substituent.

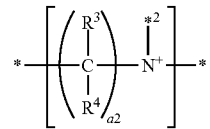

Formula B

In formula B, each of $R^3$ and $R^4$ independently denotes a hydrogen atom or an alkyl group, and a2 denotes an integer of equal to or greater than 2. The alkyleneimine chain denoted by formula B bonds to another polymer chain having an anionic group by $N^+$ in formula B and the anionic group contained in another polymer chain forming a salt crosslinking group.

The * in formulas A and B, and the *$^2$ in formula B, each independently denotes the position of a bond with an adjacent alkyleneimine chain, a hydrogen atom or a substituent.

Formulas A and B will be described in greater detail below. In the present invention and the present specification, unless specifically stated otherwise, the groups that are described can be substituted or unsubstituted. When a given group contains substituent(s), examples of the substituent are alkyl groups (such as alkyl groups having 1 to 6 carbon atoms), hydroxyl groups, alkoxy groups (such as alkoxy groups having 1 to 6 carbon atoms), halogen atoms (such as fluorine atoms, chlorine atoms, and bromine atoms), cyano groups, amino groups, nitro groups, acyl groups, and carboxyl groups. For a group having a substituent, the "number of carbon atoms" means the number of carbon atoms of the portion not containing the substituent.

Each of $R^1$ and $R^2$ in formula A, and each of $R^3$ and $R^4$ in formula B, independently denotes a hydrogen atom or an alkyl group. Examples of the alkyl groups are alkyl groups having 1 to 6 carbon atoms, desirably alkyl groups having 1 to 3 carbon atoms, preferably methyl or ethyl groups, and more preferably, methyl groups. Combinations of $R^1$ and $R^2$ in formula A include an embodiment where one denotes a hydrogen atom and the other denotes an alkyl group, an embodiment where both denote alkyl groups (identical or different alkyl groups), and desirably, an embodiment where both denote hydrogen atoms. The above matters are also applied to $R^3$ and $R^4$ in formula B.

The structure with the fewest carbon atoms constituting the ring in an alkyleneimine is ethyleneimine. The number of carbon atoms on the main chain of the alkyleneimine chain (ethyleneimine chain) obtained by opening the ring of ethyleneimine is 2. Accordingly, the lower limit of a1 in formula A and of a2 in formula B is 2. That is, each of a1 in formula A and a2 in formula B independently denotes an integer of equal to or greater than 2. Each of a1 in formula A and a2 in formula B can be independently, for example, equal to or less than 10, desirably equal to or less than 6, preferably equal to or less than 4, more preferably 2 or 3, and still more preferably, 2.

The bond between the alkyleneimine chain denoted by formula A and the alkyleneimine chain denoted by formula B and another polymer chain will be described further below.

Each of the alkyleneimine chains set forth above bonds to an adjacent alkyleneimine chain, a hydrogen atom, or a substituent at the positions denoted by * in the various formulas above. An example of a substituent is a monovalent substituent such as an alkyl group (such as an alkyl group with 1 to 6 carbon atoms), but this is not a limitation. Another polymer chain (such as a polyester chain set forth below) can also be bonded as a substituent.

The number average molecular weight of the polyalkyleneimine chain contained in the polyalkyleneimine polymer is desirably equal to or higher than 300, and preferably equal to or higher than 500. It is desirably equal to or lower than 3,000, and preferably equal to or lower than 2,000. The number average molecular weight of the polyalkyleneimine chain contained in the polyalkyleneimine polymer refers to a value obtained as described in paragraph 0027 of Japanese Unexamined Patent Publication (KOKAI) No. 2015-28830, which is expressly incorporated herein by reference in its entirety.

From the perspective of facilitating control of the 1-bromonaphthalene contact angle, the proportion accounted for by polyalkyleneimine chains in the polyalkyleneimine polymer (also referred to as the "polyalkyleneimine chain ratio", hereinafter) is desirably less than 5.0 weight percent, preferably less than or equal to 4.9 weight percent, more preferably less than or equal to 4.8 weight percent, still more preferably less than or equal to 4.5 weight percent, yet more preferably less than or equal to 4.0 weight percent, and even more preferably, less than or equal to 3.0 weight percent. From the same perspective, the polyalkyleneimine chain ratio is desirably greater than or equal to 0.2 weight percent, preferably greater than or equal to 0.3 weight percent, and more preferably, greater than or equal to 0.5 weight percent.

The above proportion accounted for by polyalkyleneimine chains can be controlled, for example, by means of the mixing ratio of polyalkyleneimine and polyester employed during synthesis.

The proportion in the polyalkyleneimine polymer accounted for by the polyalkyleneimine chain can be calculated from the results of analysis by nuclear magnetic resonance (NMR)—more specifically, $^1$H-NMR and $^{13}$C-NMR—and by elemental analysis by known methods. Since the value thus calculated is identical to or similar to the theoretical value obtained from the compounding ratio of the synthesis starting materials of the polyalkyleneimine polymer, the theoretical value obtained from the compounding ratio can be adopted as the proportion in the polyalkyleneimine polymer accounted for by the polyalkyleneimine chain (polyalkyleneimine chain ratio).

(Polyester Chain)

In addition to the polyalkyleneimine chain set forth above, the polyalkyleneimine polymer desirably contains another polymer chain(s). A desirable example of another polymer chain is a hydrophobic chain. The hydrophobic chain is desirably a polyester chain. In one embodiment, the alkyleneimine chain denoted by formula A and a polyester chain can form —N—(C=O)— by bonding of the nitrogen atom N in formula A to a carbonyl group —(C=O)— at *$^1$ in formula A. In another embodiment, the alkyleneimine chain denoted by formula B and a polyester chain can form a salt crosslinking group by means of the nitrogen cation N$^+$ in formula B and the anionic group present in a polyester chain. An example of a salt crosslinking group is one formed from the oxygen anion O$^-$ contained in a polyester chain and the N$^+$ contained in formula B. However, this is not intended as a limitation.

The polyester chain denoted by formula 1 below is an example of a polyester chain bonding to the nitrogen atom N contained in formula A by means of a carbonyl bond —(C=O)— to the alkyleneimine chain denoted by formula A. The polyester chain denoted by formula 1 below can bond to the alkyleneimine chain denoted by formula A at the bond position denoted by *$^1$ by the formation of —N—(C=O)— by the nitrogen atom contained in the alkyleneimine chain and the carbonyl group —(C=O)— contained in the polyester chain.

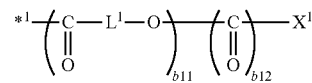

Formula 1

The polyester chain denoted by formula 2 below is an example of a polyester chain that can bond to the alkyleneimine chain denoted by formula B by means of the N$^+$ in formula B and an anionic group contained in the polyester chain forming a salt crosslinking group. In the polyester chain denoted by formula 2 below, the oxygen anion O$^-$ and the N$^+$ in formula B can form a salt crosslinking group.

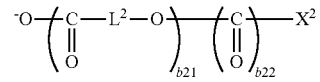

Formula 2

Each of L$^1$ in formula 1 and L$^2$ in formula 2 independently denotes a divalent linking group. A desirable example of a divalent linking group is an alkylene group having 3 to 30 carbon atoms. As set forth above, the number of carbon atoms in an alkylene group refers to the portion (main chain portion) excluding the substituent when the alkylene group contains a substituent.

Each of b11 in formula 1 and b21 in formula 2 independently denotes an integer of equal to or greater than 2; for example, an integer of equal to or less than 200. The number of repeating lactone units given in Examples further below corresponds to b11 in formula 1 or b21 in formula 2.

Each of b12 in formula 1 and b22 in formula 2 independently denotes 0 or 1.

Each of X$^1$ in formula 1 and X$^2$ in formula 2 independently denotes a hydrogen atom or a monovalent substituent. Examples of monovalent substituents are monovalent substituents selected from the group consisting of alkyl groups, haloalkyl groups (such as fluoroalkyl groups), alkoxy groups, polyalkyleneoxyalkyl groups, and aryl groups.

The alkyl group may be substituted or unsubstituted. An alkyl group substituted with at least one hydroxyl group (a hydroxyalkyl group) and an alkyl group substituted with at least one halogen atom are desirable as a substituted alkyl group. An alkyl group in which all the hydrogen atoms bonded to carbon atoms have been substituted with halogen atoms (a haloalkyl group) is also desirable. Examples of halogen atoms include fluorine, chlorine and bromine atoms. An alkyl group having 1 to 30 carbon atoms is preferred, and an alkyl group having 1 to 10 carbon atoms is of greater preference. The alkyl group can be linear, have a branched chain, or be cyclic. The same applies to a haloalkyl group.

With regard to specific examples of substituted or unsubstituted alkyl group and haloalkyl group, reference can be made to paragraph 0052 of Japanese Unexamined Patent Publication (KOKAI) No. 2015-28830. Reference can be made to paragraph 0053 of Japanese Unexamined Patent Publication (KOKAI) No. 2015-28830 with regard to specific examples of alkoxy groups.

Polyalkyleneoxyalkyl groups are monovalent substituents denoted by $R^{10}(OR^{11})n(O)m$-. $R^{10}$ denotes an alkyl group, $R^{11}$ denotes an alkylene group, n denotes an integer of equal to or greater than 2, and m denotes 0 or 1.

The alkyl group denoted by $R^{10}$ is as described for the alkyl groups denoted by $X^1$ and $X^2$. The details of the alkylene group denoted by $R^{11}$ are as follows. The above description of the alkyl groups denoted by $X^1$ and $X^2$ can be applied to these alkylene groups by reading alkylenes with one fewer hydrogen atom for the former (for example, by reading "methylene group" for "methyl group"). n denotes an integer of equal to or greater than 2; for example, an integer of equal to or less than 10, desirably equal to or less than 5.

The aryl group can be substituted and can be a condensed ring. It is preferably an aryl group with 6 to 24 carbon atoms, such as a phenyl group, a 4-methylphenyl group, 4-phenylbenzoic acid, a 3-cyanophenyl group, a 2-chlorophenyl group, or a 2-naphthyl group.

The polyester chains denoted by formulas 1 and 2 above can be structures derived from polyesters obtained by known polyester synthesis methods. Lactone ring-opening polymerization is an example of a polyester synthesis method. Examples of lactones are those described in paragraph 0056 of Japanese Unexamined Patent Publication (KOKAI) No. 2015-28830. ε-caprolactone, lactides, and δ-valerolactone are desirable as lactones from the perspectives of reactivity and/or availability. However, there is no limitation thereto. Any lactone yielding polyester by means of ring-opening polymerization will do.

With regard to nucleophilic reagents in lactone ring-opening polymerization, reference can be made to paragraph 0057 of Japanese Unexamined Patent Publication (KOKAI) No. 2015-28830.

However, the above polyester chain is not limited to a structure derived from polyester obtained by lactone ring-opening polymerization. It can have a structure derived from polyester obtained by a known polyester synthesis method such as polycondensation of a polyvalent carboxylic acid and polyhydric alcohol or polycondensation of a hydroxycarboxylic acid.

From the perspective of facilitating control of the 1-bromonaphthylene contact angle, the number average molecular weight of the polyester chain is desirably greater than or equal to 200, preferably greater than or equal to 400, and more preferably, greater than or equal to 500. From the same perspective, the number average molecular weight of the polyester chain is desirably less than or equal to 100,000, preferably less than or equal to 50,000. The term "number average molecular weight of the polyester chain" refers to a value that is obtained as described in paragraph 0059 of Japanese Unexamined Patent Publication (KOKAI) No. 2015-28830.

(Weight Average Molecular Weight of the Polyalkyleneimine Polymer)

The average molecular weight of the polyalkyleneimine polymer is, for example, greater than or equal to 1,000, and also by way of example, less than or equal to 80,000, as a weight average molecular weight. The weight average molecular weight of the polyalkyleneimine polymer is desirably greater than or equal to 1,500, preferably greater than or equal to 2,000, and more preferably greater than or equal to 3,000. In one embodiment, the weight average molecular weight of the polyalkyleneimine polymer is desirably less than or equal to 60,000, preferably less than or equal to 40,000, more preferably less than or equal to 35,000, still more preferably less than or equal to 34,000, still further preferably less than or equal to 30,000, still further more preferably less than or equal to 20,000, yet still further more preferably, less than or equal to 10,000.

In the present invention and the present specification, the term "weight average molecular weight of the polyalkyleneimine polymer" refers to a value that is obtained by gel permeation chromatography (GPC) and converted to the standard styrene conversion. Reference can be made to Examples of Japanese Unexamined Patent Publication (KOKAI) No. 2015-28830, for measurement conditions.

(Synthesis Method)

The method of synthesizing the polyalkyleneimine polymer is not specifically limited. For one desirable form of a synthesis method, reference can be made to Japanese Unexamined Patent Publication (KOKAI) No. 2015-28830, paragraphs 0061 to 0069 and the Examples of the same.

(Other Polymer Chains)

The polyalkyleneimine polymer can have polymer chain(s) other than a polyester chain, or can have polymer chain(s) other than a polyester chain in addition to a polyester chain. As regards the introduction of a polyester chain, such a polymer chain can be introduced into a polyalkyleneimine polymer by a method identical to the method described in the above-cited paragraphs of Japanese Unexamined Patent Publication (KOKAI) No. 2015-28830, for example.

<<Other Amine Polymers>>

The above-described polyalkyleneimine polymer is a type of amine polymer. The nitrogen-containing polymer can be an amine polymer other than a polyalkyleneimine polymer. Further, a polyalkyleneimine polymer and another amine polymer can be employed in combination.

The amine polymer can be a primary amine denoted by $NH_2R$, a secondary amine denoted by $NHR_2$, or a tertiary amine denoted by $NR_3$. In these formulas, R denotes any structure constituting an amine polymer. A plurality of R being present can be identical or different.

Examples of the polymer chain that is present on the amine polymer are various polymer chains such as polyester chains, polyamide chains, and polyurethane chains. The number average molecular weight of the polymer chain desirably falls within the range given for the polyester chain of the polyalkyleneimine polymer set forth above. Amine polymers synthesized by known methods, as well as commercial products, can be employed. Specific examples of commercial products are ANTI-TERRA-U/U100, ANTI-TERRA-204/205, DISPERBYK-101, DISPERBYK-102, DISPERBYK-103, DISPERBYK-106, DISPERBYK-108, DISPERBYK-109, DISPERBYK-110, DISPERBYK-111, DISPERBYK-112, DISPERBYK-116, DISPERBYK-130, DISPERBYK-140, DISPERBYK-142, DISPERBYK-145, DISPERBYK-161, DISPERBYK-162, DISPERBYK-163, DISPERBYK-164, DISPERBYK-166, DISPERBYK-160, DISPERBYK-167, DISPERBYK-168, DISPERBYK-170, DISPERBYK-171, DISPERBYK-174, DISPERBYK-180, DISPERBYK-182, DISPERBYK-183, DISPERBYK-184, DISPERBYK-185, DISPERBYK-2000, DISPERBYK-2001, DISPERBYK-2020, DISPERBYK-2050, DISPERBYK-2070, DISPERBYK-2096, DISPERBYK-2150, BYK-P104, BYK-P105, BYK-9076, BYK-9077, BYK-220S, manufactured by BYK Japan. However, the amine polymer is not limited to those exemplified above.

One or more of the nitrogen-containing polymers set forth above can be contained in the magnetic layer. From the perspective of ease of controlling the 1-bromonaphthalene contact angle, the content of the nitrogen-containing polymer, desirably the amine polymer, in the magnetic layer is desirably greater than or equal to 0.5 weight part, preferably greater than or equal to 1.0 weight part, per 100.0 weight parts of ferromagnetic powder. From the same perspective, the content of the nitrogen-containing polymer in the magnetic layer is desirably less than or equal to 50.0 weight parts, preferably less than or equal to 40.0 weight parts, more preferably less than or equal to 30.0 weight parts, still more preferably less than or equal to 20.0 weight parts, and yet more preferably, less than or equal to 15.0 weight parts, per 100 weight parts of ferromagnetic powder.

Various layers and nonmagnetic support of the above magnetic tape will be further described in detail below.

[Magnetic Layer]
<Ferromagnetic Powder>

As stated above, an example of one way to adjust the base portion friction is to adjust it by means of the ferromagnetic powder. The various types of powder that are commonly employed as ferromagnetic powder in the magnetic layers of magnetic tapes can be employed as the ferromagnetic powder that is incorporated into the magnetic layer of the above magnetic tape.

A specific form of adjustment by means of ferromagnetic powder is to form the magnetic layer using two or more types of ferromagnetic powder of differing average particle size as the ferromagnetic powder. In this case, from the perspective of enhancing the recording density of the magnetic tape, it is desirable to employ ferromagnetic powder with a small average particle size as the ferromagnetic powder employed in the greatest proportion in the magnetic layer. From this perspective, when employing ferromagnetic powders in the magnetic layer in the form of two or more kinds of ferromagnetic powder of differing average particle size, it is desirable to employ ferromagnetic powder with an average particle size of less than or equal to 50 nm as the ferromagnetic powder employed in the greatest proportion. From the perspective of stable magnetization, the average particle size of the ferromagnetic powder employed in the greatest proportion is desirably greater than or equal to 10 nm. When not employing two or more types of ferromagnetic powder of differing average particle size, but rather one ferromagnetic powder, the average particle size of the ferromagnetic powder employed is desirably less than or equal to 50 nm, and desirably greater than or equal to 10 nm, for the above reasons.

By contrast, the ferromagnetic powder that is employed along with the ferromagnetic powder employed in the greatest proportion desirably has an average particle size that is greater than that of the ferromagnetic powder that is employed in the greatest proportion. That is because it is assumed that protrusions formed on the base portion by ferromagnetic powder of large average particle size can reduce the base portion friction. From this perspective, the difference between the average particle size of the ferromagnetic powder employed in the greatest proportion and the average particle size of the ferromagnetic powder employed with it, denoted as the "(average particle size of the latter)–(average particle size of the former)", desirably falls within a range of 10 nm to 80 nm, preferably falls within a range of 10 nm to 50 nm, more preferably falls within a range of 10 nm to 40 nm, and still more preferably, falls within a range of 12 nm to 35 nm. It is also naturally possible to employ two or more kinds of ferromagnetic powder of differing average particle size as the ferromagnetic powder that is employed with the ferromagnetic powder employed in the greatest proportion. In that case, the average particle size of at least one of the two or more kinds of ferromagnetic powder desirably satisfies the above difference with the average particle size of the ferromagnetic powder employed in the greatest proportion. It is desirable for the average particle sizes of more of the ferromagnetic powders to satisfy this difference, and preferably for all of the average particle sizes of the ferromagnetic powders to satisfy this difference.

From the perspective of controlling the base portion friction, it is desirable for the mixing ratio of the ferromagnetic powder employed in the greatest proportion to the additional ferromagnetic powder (when two or more kinds of additional ferromagnetic powder with differing average particle size are employed, the combined total thereof) to fall within a range based on weight of former:latter=90.0:10.0 to 99.9:0.1, preferably within a range of 95.0:5.0 to 99.5:0.5, with regard to two or more kinds of ferromagnetic powder of differing average particle size.

The term "ferromagnetic powders of differing average particle size" refers to all or some part of the ferromagnetic powder lot having different average particle sizes. A particle size distribution based on volume or based on number of ferromagnetic powder contained in the magnetic layer of a magnetic tape formed using ferromagnetic powders of differing average particle sizes in this manner can be measured by a known measurement method such as the dynamic light scattering method or laser diffraction. When this is done, at the average particle size of the ferromagnetic powder employed in the greatest proportion, or in the vicinity thereof, a maximum peak will normally be found in the particle size distribution curve obtained by measurement. There will also be cases where a peak will be found at the average particle size of various ferromagnetic particles or in the vicinity thereof. Accordingly, when measuring the particle size distribution of ferromagnetic powder contained in the magnetic layer of a magnetic tape formed using the first ferromagnetic powder with an average particle size of 10 nm to 50 nm, for example, in the greatest proportion, a maximum peak will normally be found within the particle size range of 10 nm to 50 nm in the particle size distribution curve.

A portion of the above additional ferromagnetic powder can be replaced with nonmagnetic powder, described further below.

The average particle size of the ferromagnetic powder in the present invention and the present specification is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and the present specification, the average particle size of the powder, such as ferromagnetic powder and various kinds of powder, is the average particle size as obtained by the above method. The average particle size indicated in Examples further below was obtained using a Model H-9000 transmission electron microscope made by Hitachi and KS-400 image analysis software made by Carl Zeiss. The term "powder" means a collection of a plurality of particles. For example, ferromagnetic powder means a collection of a plurality of ferromagnetic particles. The term "collection" is not limited to forms in which the constituent particles are in direct contact, but also includes forms where binder and/or additives and the like are present between the particles. The term "particles" will also sometimes be used to denote powder.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention and specification, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

A desirable specific example of the ferromagnetic powder is ferromagnetic hexagonal ferrite powder. When the ferromagnetic powder employed in the greatest proportion is ferromagnetic hexagonal ferrite powder, the average particle size (for example, average plate diameter), from the perspective of achieving high density recording and stable magnetization, is desirably greater than or equal to 10 nm and less than or equal to 50 nm, preferably greater than or equal to 20 nm and less than or equal to 50 nm. Reference can be made, for example, to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is a specific example of desirable ferromagnetic powder. When the ferromagnetic powder that is employed in the greatest proportion is ferromagnetic metal powder, the average particle size thereof (for example, average major axis length), from the perspective of achieving higher density recording and stable magnetization, is desirably greater than or equal to 10 nm and less than or equal to 50 nm, preferably greater than or equal to 20 nm and less than or equal to 50 nm. Reference can be made, for example, to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powders. The contents of the above publications are expressly incorporated herein by reference in their entirety.

The above magnetic tape can contain ferromagnetic powder in the form of ferromagnetic hexagonal ferrite powder alone, ferromagnetic metal powder alone, or both, or can contain other ferromagnetic powder in addition to ferromagnetic hexagonal ferrite powder and/or ferromagnetic metal powder.

The content (fill rate) of ferromagnetic powder in the magnetic layer desirably falls within a range of 50 to 90 weight percent, preferably within a range of 60 to 90 weight percent. Components other than ferromagnetic powder in the magnetic layer include at least binder. The above magnetic tape further contains an abrasive. One or more types of additives can also be further incorporated. A high fill rate of ferromagnetic powder in the magnetic layer is desirable from the perspective of enhancing the recording density.

<Abrasive>

The above magnetic tape contains an abrasive in the magnetic layer. Nonmagnetic powder having a Mohs hardness of greater than 8 is desirable, and nonmagnetic powder having a Mohs hardness of greater than or equal to 9 is preferred as the abrasive. The maximum Mohs hardness is the 10 of diamond. Specific examples are alumina ($Al_2O_3$), silicon carbide, boron carbide ($B_4C$), TiC, cerium oxide, zirconium oxide ($ZrO_2$), and diamond powder. Of these, alumina is desirable. Alumina is a desirable abrasive in that particularly good dispersion enhancement can be achieved in combination with the dispersing agent described in Japanese Unexamined Patent Publication (KOKAI) No. 2013-131285, paragraphs 0012 to 0022 (Phenolic hydroxyl group-containing aromatic hydrocarbon compound). Reference can be made to Japanese Unexamined Patent Publication (KOKAI) No. 2013-229090, paragraph 0021 with regard to alumina. The contents of the above publications are expressly incorporated herein by reference in their entirety. The specific surface area can be employed as an indicator of the particle size of an abrasive. The greater the specific surface area, the smaller the particle size signified. The specific surface area is a value obtained by the nitrogen adsorption method (also called the Brunauer-Emmett-Teller (BET) one point method). It is a value that is measured for primary particles. The specific surface area obtained by this method will be referred to as the BET specific surface area hereinafter. From the perspective of enhancing the surface smoothness of the magnetic layer, it is desirable to employ an abrasive with a BET specific surface area of greater than or equal to 14 m$^2$/g. From the perspective of dispersion, it is desirable to employ an abrasive with a BET specific surface area of less than or equal to 40 m$^2$/g. The content of abrasive in the magnetic layer is desirably 1.0 to 20.0 weight parts, preferably 1.0 to 10.0 weight parts, per 100.0 weight parts of ferromagnetic powder.

<Binder, Curing Agent>

The above magnetic tape is a particulate magnetic tape and contains ferromagnetic powder and binder in the magnetic layer. The binder contains one or more resins. The resins can be homopolymers or copolymers. The various resins that are commonly employed as binders in particulate magnetic recording media such as magnetic tapes can be employed as the binder. Examples of binders are: polyurethane resin, polyester resin, polyamide resin, vinylchloride resin, styrene, copolymerized acrylic resin of acrylonitrile, methyl methacrylate, and the like; nitrocellulose and other cellulose resin; epoxy resin; phenoxy resin; and polyvinyl acetal, polyvinyl butyral, and other polyvinyl alkyral resin. These can be employed singly, or multiple resins can be mixed for use. Of these, polyurethane resin, acrylic resin, cellulose resin, and vinylchloride resin are desirable. These resins can also be employed as binders in the backcoat layer and the nonmagnetic layer that can be provided. Reference can be made to Japanese Unexamined Patent Publication (KOKAI) No. 2010-24113, paragraphs 0028 to 0031, with regard to these resins. The content of the above publication is expressly incorporated herein by reference in its entirety. The average molecular weight of resins that are employed as binders is, by way of example, greater than or equal to 30,000, and less than or equal to 200,000 as a weight average molecular weight.

A curing agent can be employed along with the above resins employed as binders. The curing agent can be a thermosetting compound—a compound in which a curing reaction (crosslinking reaction) progresses when heated—in one embodiment. In another embodiment, the curing agent can be a photo-curable compound—a compound in which a curing reaction (crosslinking reaction) progresses when irradiated with light. Thermosetting compounds are desirable as curing agents; polyisocyanate is suitable. Reference can be made to Japanese Unexamined Patent Publication 2011-216149, paragraphs 0124 and 0125, for details regarding polyisocyanate. In the magnetic layer-forming composition, the curing agent can be employed, for example, in a quantity of 0 to 80.0 weight parts per 100.0 weight parts of binder. From the perspective of enhancing strength of the magnetic layer, a curing agent can be added in a quantity of 50.0 to 80.0 weight parts for use.

<Additives>

The magnetic layer contains ferromagnetic powder, abrasive, and binder. As necessary, one or more additives can be incorporated. The above curing agent is an example of an additive. The curing agent can be incorporated into the magnetic layer in a state where some portion has been reacted (crosslinked) with other components such as the binder by the progression of a curing reaction in the magnetic layer-forming process. Examples of additives that can be incorporated into the magnetic layer are nonmagnetic powder other than abrasive (such as inorganic powder and carbon black), lubricants, dispersing agents, dispersion adjuvants, antifungal agents, antistatic agents, and oxidation inhibitors. The additives can be used by suitably selecting commercial products based on desired properties.

Examples of additives are nonmagnetic powders (referred to hereinafter as "protrusion-forming agents") for controlling friction characteristics (lowering the coefficient of friction). The protrusion-forming agent can be an inorganic material or an organic material. In one embodiment, from the perspective of achieving uniform friction characteristics, the particle size distribution of the protrusion-forming agent is desirably a monodispersion exhibiting a single peak, and not that of a multiple dispersion exhibiting multiple peaks in the distribution thereof. From the perspective of the availability of monodisperse particles, nonmagnetic powder in the form of powder or an inorganic material (inorganic powder) is desirable. Examples of inorganic powders are various powders of metal oxides, metal carbonates, metal sulfates, metal nitrides, metal carbides, and metal sulfides. Powders of inorganic oxides are desirable. The protrusion-forming agent is preferably a colloidal particle, and more preferably an inorganic oxide colloidal particle. From the perspective of the availability of monodisperse particles, the inorganic oxide constituting the inorganic oxide colloidal particle is desirably silicon dioxide (silica). The metal oxide colloidal particle is preferably colloidal silica (a silica colloid particle). In the present invention and present specification, the term "colloidal particles" refers to particles that are capable of dispersing to yield a colloidal dispersion without precipitating when added in a quantity of 1 g per 100 mL to at least one organic solvent in the form of at least methyl ethyl ketone, cyclohexanone, toluene, and ethyl acetate, or a mixed solvent containing two or more of these solvents in any blending ratio. The average particle size of the colloidal particles is a value that is determined by the method described as the average particle diameter measurement method in Japanese Unexamined Patent Publication (KOKAI) No. 2011-048878, paragraph 0015. In another embodiment, the protrusion-forming agent is desirably carbon black.

The average particle size of the protrusion-forming agent is, for example, 30 nm to 300 nm, desirably 40 nm to 200 nm. The content of the protrusion-forming agent in the magnetic layer is desirably 1.0 to 4.0 weight parts, preferably 1.5 to 3.5 weight parts, per 100.0 weight parts of ferromagnetic powder.

As set forth above, other nonmagnetic powders can be employed in addition to the nonmagnetic powder set forth above to control the base portion friction to less than or equal to 0.35. Such nonmagnetic powder desirably has a Mohs hardness of less than or equal to 8. The various nonmagnetic powders that are commonly employed in nonmagnetic layers can be employed. The specific details are as set forth for the nonmagnetic layer. Bengala (colcothar) is an example of a preferred nonmagnetic powder. Bengala has a Mohs hardness of about 6.

In the same manner as for the ferromagnetic powder that is employed along with the ferromagnetic powder employed in the greatest proportion as set forth above, an average particle size that is greater than that of the ferromagnetic powder is desirable in the additional nonmagnetic powder. That is because it permits a reduction in the base portion friction by means of protrusions formed on the base portion by the additional nonmagnetic powder. From this perspective, the difference between the average particle size of the ferromagnetic powder and the average particle size of the additional nonmagnetic powder employed with it, obtained as "(average particle size of latter)–(average particle size of former)", desirably falls within a range of 10 nm to 80 nm, preferably within a range of 10 nm to 50 nm. When employing two or more kinds of ferromagnetic powder of differing average particle size as the ferromagnetic powder, the ferromagnetic powder that is employed in the greatest proportion is adopted among the two or more kinds of ferromagnetic powder as the ferromagnetic powder that is used to calculate the difference in average particle size with the additional nonmagnetic powder. It is naturally also possible to employ two or more kinds of nonmagnetic powder of differing average particle size as the additional nonmagnetic powder. In that case, it is desirable for the average particle size of at least one of the two or more kinds of nonmagnetic powder to satisfy the above difference, preferable for many of the average particle sizes of the nonmagnetic powders to satisfy this difference, and more preferable for the average particle sizes of all of the additional nonmagnetic powders to satisfy this difference.

From the perspective of controlling the base portion friction, the mixing ratio of the ferromagnetic powder and the above additional nonmagnetic powder (the combined total when employing two or more kinds of additional nonmagnetic powder with differing average particle sizes) based on weight desirably falls within a range of former: latter=90.0:10.0 to 99.9:0.1, preferably within a range of 95.0:5.0 to 99.5:0.5.

[Nonmagnetic Layer]

The nonmagnetic layer will be described next. In the above magnetic tape, a magnetic layer can be present directly on the nonmagnetic support, or a nonmagnetic layer containing nonmagnetic powder and binder can be present between the nonmagnetic support and the magnetic layer. The nonmagnetic powder that is employed in the nonmagnetic layer can be an organic or an inorganic material. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content (fill rate) of nonmagnetic powder in the nonmagnetic layer desirably falls within a range of 50 weight % to 90 weight %, preferably within a range of 60 weight % to 90 weight %.

Known techniques can be applied to the nonmagnetic layer with regard to the binder, additives, and other details relating to the nonmagnetic layer. For example, known techniques relating to the magnetic layer can be applied to the quantity and type of binder and the quantity and type of additives.

The nonmagnetic layer in the above magnetic tape may be in the form of an essentially nonmagnetic layer containing small quantities of ferromagnetic powder, either in the form of impurities or by intention, for example, along with nonmagnetic powder. In the present invention, the term "essentially nonmagnetic layer" refers to a layer with a residual magnetic flux density of less than or equal to 10 mT, a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

[Nonmagnetic Support]

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

[Thickness of Nonmagnetic Support, Thickness of Various Layers]

The thickness of the nonmagnetic support is desirably 3.00 µm to 20.00 µm, preferably 3.00 µm to 10.00 µm, more preferably 3.00 µm to 6.00 µm, and still more preferably, 3.00 µm to 4.50 µm.

The thickness of the magnetic layer is desirably optimized based on the saturation magnetization of the magnetic head employed, the head gap length, the bandwidth of the recording signal, and the like. To achieve higher density recording, the thickness of the magnetic layer is desirably 10 nm to 100 nm, preferably 20 nm to 90 nm. The magnetic layer can consist of at least one layer, or can be separated into two or more layers having different magnetic characteristics applying a known multilayer magnetic layer configuration. When separated into two or more layers, the thickness of the magnetic layer refers to the combined thickness of these layers.

The thickness of the nonmagnetic layer is, for example, greater than or equal to 0.05 µm, preferably greater than or equal to 0.07 µm, and more preferably, greater than or equal to 0.10 µm. Additionally, the thickness of the nonmagnetic layer is desirably less than or equal to 0.80 µm, preferably less than or equal to 0.50 µm.

[Backcoat Layer]

A backcoat layer can be present on the opposite side of the nonmagnetic support from that on which the magnetic layer is present in the above magnetic tape. The backcoat layer is a layer that contains nonmagnetic powder and binder. The backcoat layer desirably contains nonmagnetic powder in the form of either one of, or both, carbon black and inorganic powder. A known backcoat layer formula can be applied as the formula of the backcoat layer-forming composition (such as the types and contents of binder and various additives). The backcoat layer is desirably less than or equal to 0.90 µm, preferably 0.10 µm to 0.70 µm, in thickness.

The thickness of the various layers and nonmagnetic support of the magnetic tape can be determined by known film thickness measurement methods. As an example, the cross section of the magnetic tape in the direction of thickness can be exposed by a known method such as an ion beam or microtome, and the exposed cross section can be observed by a scanning electron microscope. The various thicknesses can be determined as the thickness determined at one spot in the direction of thickness, or as the arithmetic average of the thicknesses obtained at multiple spots, such as two or more, for example, two, randomly extracted spots. The thickness of the various layers can also be determined as the design thickness calculated from the manufacturing conditions.

[Process of Manufacturing Magnetic Tape]

<Preparation of Compositions for Forming Various Layers>

The compositions for forming the magnetic layer, as well as optionally provided nonmagnetic layer and backcoat layer normally contain solvent in addition to the various components that have been set forth above. Examples of the solvent are the various organic solvents generally employed in the manufacturing of particulate magnetic recording media. The process of preparing the compositions for forming the various layers normally includes at least a kneading step, a dispersion step, and mixing steps provided before and after these steps as needed. Each of these steps can be divided into two or more stages. All of the materials in the form of ferromagnetic powder, nonmagnetic powder, binder, various additives, solvent, and the like can be added at the start, or part way through, any of these steps. The material can be divided for addition in two or more steps. For example, in one embodiment, a dispersion (magnetic liquid) containing ferromagnetic powder and a dispersion (abrasive liquid) containing abrasive can be separately prepared by dispersion, and then simultaneously or sequentially mixed with the other components to prepare a magnetic layer-forming composition. Additionally, reference can be made to paragraph 0065 of Japanese Unexamined Patent Publication (KOKAI) No. 2010-231843, which is expressly incorporated herein by reference in its entirety, with regard to preparing individual layer-forming compositions.

In one embodiment, in controlling the base portion friction as set forth above, two or more ferromagnetic powders of differing average particle size can be employed to manufacture the magnetic tape. That is, the magnetic layer can be formed using ferromagnetic powders in the form of a first ferromagnetic powder and one or more ferromagnetic powders of greater average particle size than the first ferromagnetic powder. The following embodiments are examples of forms of desirable methods of forming such a magnetic layer. Two or more of the embodiments given below can be combined as a preferred embodiment of the above manufacturing method. The "first ferromagnetic powder" refers to one of the ferromagnetic powder among the two or more kinds of ferromagnetic powder employed, and desirably refers to the ferromagnetic powder that is employed in the greatest proportion as set forth above. Other details regarding the method of forming the magnetic layer are as set forth above.

The average particle size of the first ferromagnetic powder can fall within a range of 10 nm to 80 nm.

The difference between the average particle size of the ferromagnetic powder with an average particle size greater than that of the first ferromagnetic powder and the average particle size of the first ferromagnetic powder can fall within a range of 10 nm to 50 nm.

The mixing ratio of the first ferromagnetic powder to the ferromagnetic powder with an average particle size greater than that of the first ferromagnetic powder, by weight, can fall within a range of former:latter=90.0:10.0 to 99.9:0.1.

In another embodiment, the magnetic tape can be manufactured using additional nonmagnetic powder in addition to the abrasive and protrusion-forming agent as nonmagnetic powders in the magnetic layer. That is, the magnetic layer can be formed using additional nonmagnetic powder along with the abrasive and protrusion-forming agent as the nonmagnetic powder. The following embodiments are examples of a desirable embodiment of the method of forming such a magnetic layer. A combination of two or more of the following embodiments is a preferred embodiment of the above manufacturing method. Other details regarding the method of forming the magnetic layer are as set forth above.

The average particle size of the additional nonmagnetic powder can be greater than the average particle size of the ferromagnetic powder.

The difference between the average particle size of the ferromagnetic powder and the average particle size of the additional nonmagnetic powder can fall within a range of 10 nm to 80 nm.

The mixing ratio of the ferromagnetic powder and the additional nonmagnetic powder, based on weight, can fall within a range of former:latter=90.0:10.0 to 99.9:0.1.

<Coating Process>

The magnetic layer can be formed by directly coating the magnetic layer-forming composition, or by sequentially or simultaneous multilayer coating it with the nonmagnetic layer-forming composition, on the surface of a nonmagnetic support. The backcoat layer can be formed by coating the backcoat layer-forming composition on the surface on the opposite side of the nonmagnetic support from that on which the magnetic layer has been provided, or is to be provided. Reference can be made to Japanese Unexamined Patent Publication (KOKAI) No. 2010-231843, paragraph 0066, for details regarding coatings to form various layers.

<Other Processes>

Reference can be made to Japanese Unexamined Patent Publication (KOKAI) No. 2010-231843, paragraphs 0067 to 0070, with regard to various other processes in the manufacturing of a magnetic tape. An example of processing that is conducted in other processes is surface treatment of the surface of the magnetic layer. This surface treatment is desirable to increase the surface smoothness of the magnetic layer. One example of surface treatment of the surface of the magnetic layer is the polishing treatment employing the polishing means described in Japanese Unexamined Patent Publication (KOKAI) Heisei No. 5-62174, which is expressly incorporated herein by reference in its entirety. Reference can be made to paragraphs 0005 to 0032 and the entirety of the drawings of the same publication with regard to the surface treatment.

The magnetic tape of an aspect of the present invention as set forth above has a surface smoothness such that the magnetic layer surface Ra is less than or equal to 1.8 nm, and makes it possible to inhibit a drop in the abrasiveness of the surface of the magnetic layer with repeated running at low humidity. For example, a magnetic tape cartridge housing the above magnetic tape can be loaded into a drive and the magnetic tape can be repeatedly run within the drive to conduct recording and/or reproduction. In this process, so long as the surface of the magnetic layer can continue to exhibit good abrasiveness, the drop with repeated running of the good electromagnetic characteristics resulting from the high surface smoothness of the magnetic layer can be inhibited.

EXAMPLES

The present invention will be described in greater detail below through Examples. However, the present invention is not limited to the embodiments shown in Examples. The "parts" indicated below denotes "weight parts" unless otherwise stated.

Polymer A below, which was employed as a 1-bromonaphthalene contact angle-adjusting component, is a polyalkyleneimine polymer synthesized by the following method. A commercial amine polymer (DISPERBYK-102 made by BYK Japan) was employed as polymer B below.

Synthesis Example of Polymer A
(Polyalkyleneimine Polymer)

The acid values and amine values given below were determined by the potentiometric method (solvent: tetrahydrofuran/water=100/10 (volumetric ratio), titrant: 0.01 N (0.01 mol/L) sodium hydroxide aqueous solution (acid value), 0.01 N (0.01 mol/L) hydrochloric acid (amine value)).

The number average molecular weights and weight average molecular weights given below were obtained by measurement by GPC and converted to polystyrene values.

The various measurement conditions for the average molecular weight of polyester, polyalkyleneimine, and polyalkyleneimine polymer were as given below.

(Measurement Conditions for Average Molecular Weight of Polyester)

Measurement apparatus: HLC-8220 GPC (made by Tosoh Corp.)

Column: TSKgel Super HZ 2000/TSKgel Super HZ 4000/TSKgel Super HZ-H (made by Tosoh Corp.)

Eluent: Tetrahydrofuran (THF)

Flow rate: 0.35 mL/min

Column temperature: 40° C.

Detector: Differential refractive (RI) detector (Measurement Conditions for Average Molecular Weight of Polyalkyleneimine and Average Molecular Weight of Polyalkyleneimine Polymer)

Measurement apparatus: HLC-8320 GPC (made by Tosoh Corp.)

Column: Three TSKgel Super AWM-Hs (made by Tosoh Corp.)

Eluent: N-methyl-2-pyrrolidone (with 10 mM lithium bromide added as additive)

Flow rate: 0.35 mL/min

Column temperature: 40° C.

Detector: RI (Synthesis of Polyester (i-1))

In a 500 mL, three-necked flask were mixed 16.8 g of carboxylic acid in the form of n-octanoic acid (Wako Pure Chemical Industries, Ltd.), 100 g of lactone in the form of ε-caprolactone (Praxel M made by Daicel Chemical Industries, Inc.), and 2.2 g of catalyst in the form of monobutyltin oxide (Wako Pure Chemical Industries, Ltd.) ($C_4H_9Sn(O)OH$) and the mixture was heated for 1 hour at 160° C. A 100 g quantity of ε-caprolactone was added dropwise over 5 hours and the mixture was stirred for another two hours. Subsequently, the mixture was cooled to room temperature, yielding polyester (i-1).

The synthesis schema is indicated below.

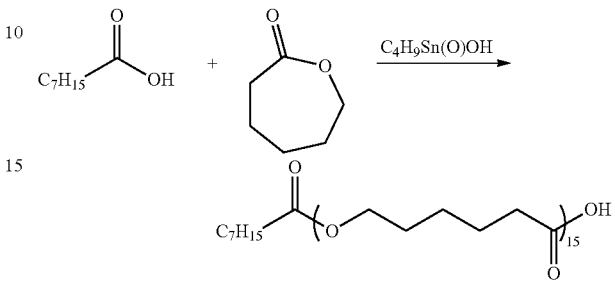

The number average molecular weight and weight average molecular weight of the polyester obtained are given in Table 1 below. The number of units of lactone repeating unit that was calculated from the starting material charge ratio is also given in Table 1.

(Synthesis of Polyethyleneimine Polymer)

A 2.4 g quantity of polyethyleneimine (SP-006, made by Nippon Shokubai Co., number average molecular weight 600) and 100 g of polyester (i-1) were mixed and heated for 3 hours at 110° C., yielding polyethyleneimine polymer.

Based on the results of two forms of NMR analysis, $^1$H-NMR and $^{13}$C-NMR, and on the results of elemental analysis by the combustion method conducted on the polyalkyleneimine polymer that was obtained, the ratio (polyalkyleneimine chain ratio) accounted for by the polyalkyleneimine chain in the polyalkyleneimine polymer was calculated. The results are given in Table 1. The calculated polyalkyleneimine chain ratio was the same value as the value calculated from the quantities of polyalkyleneimine and polyester charged.

TABLE 1

| | Polyester | Carboxylic acid | Quantity of carboxylic acid charged (g) | Lactone | Weight average molecular weight | Number average molecular weight | Number of repeating lactone units |
|---|---|---|---|---|---|---|---|
| Synthesis of polyester | (i-1) | n-octanoic acid | 16.8 | ε-caprolactone | 7,000 | 5,800 | 15 |

| | Quantity of polyethylene-imine charged (g) | Polyalkyleneimine chain (polyethyleneimine chain) ratio | Polyester | Acid value (mgKOH/g) | Amine value (mgKOH/g) | Weight average molecular weight |
|---|---|---|---|---|---|---|
| Synthesis of polyalkyleneimine (polyethyleneimine) polymer | 2.4 | 2.3 | (i-1) | 35.0 | 17.4 | 7,000 |

Example of Fabrication of Magnetic Tape

Example 1

The formulas of the individual layer-forming compositions are given below.
(Magnetic Layer-Forming Composition)
(Magnetic Liquid)
Ferromagnetic powder 100.0 parts
Ferromagnetic hexagonal barium ferrite powder (1):
  See Table 2 for average particle size (average plate diameter) and formula ratio
Ferromagnetic hexagonal barium ferrite powder (2):
  See Table 2 for average particle size (average plate diameter) and formula ratio
Oleic acid: 2.0 parts
Vinyl chloride copolymer (MR-104 made by Zeon Corp.): 10.0 parts
$SO_3Na$ group containing polyurethane resin: 4.0 parts
  (weight average molecular weight: 70,000, $SO_3Na$ groups: 0.07 meq/g)
1-Bromonaphthalene contact angle-adjusting component (See Table 2): See Table 2
Methyl ethyl ketone: 150.0 parts
Cyclohexanone: 150.0 parts
(Abrasive Liquid)
α-Alumina (BET specific surface area: 19 m²/g): 6.0 parts
$SO_3Na$ group-containing polyurethane resin: 0.6 part
  (weight average molecular weight: 70,000, $SO_3Na$ groups: 0.1 meq/g)
2,3-Dihydroxynaphthalene: 0.6 part
Cyclohexanone: 23.0 parts
(Protrusion-Forming Agent Liquid)
Colloidal silica (average particle size: 120 nm): 2.0 parts
Methyl ethyl ketone: 8.0 parts
(Lubricant, Curing Agent Liquid)
Stearic acid: See Table 2
Amide stearate: 0.3 part
Butyl stearate: 6.0 parts
Methyl ethyl ketone: 110.0 parts
Cyclohexanone: 110.0 parts
Polyisocyanate: 3.0 parts
  (Coronate (Japanese registered trademark) L, made by Nippon Polyurethane Industry Co., Ltd.)
(Nonmagnetic Layer-Forming Composition)
Carbon black: 100.0 parts
  (average particles size: 16 nm, dibutyl phthalate (DBP) oil absorption capacity: 74 cm³/100 g)
Trioctylamine: 4.0 parts
Vinyl chloride copolymer (MR-104, made by Zeon Corp.): 19.0 parts
$SO_3Na$ group-containing polyurethane resin: 12.0 parts
  (weight average molecular weight: 50,000, $SO_3Na$ groups: 0.07 meq/g)
Methyl ethyl ketone: 370.0 parts
Cyclohexanone: 370.0 parts
Stearic acid: 2.0 parts
Amide stearate: 0.3 part
Butyl stearate: 2.0 parts
(Backcoat Layer-Forming Composition)
Bengala: 80.0 parts
  (average particle size: 0.15 μm, average acicular ratio: 7, BET specific surface area: 52 m²/g)
Carbon black: 20.0 parts
  (average particle size: 16 nm, DBP oil adsorption capacity: 74 cm³/100 g)
Phenylphosphonic acid: 3.0 parts
Vinyl chloride copolymer (MR-104 made by Zeon Corp.): 12.0 parts
$SO_3Na$ group-containing polyurethane resin: 8.0 parts
  (weight average molecular weight: 50,000, $SO_3Na$ groups: 0.07 meq/g)
α-Alumina (BET specific surface area: 17 m²/g): 5.0 parts
Methyl ethyl ketone: 370.0 parts
Cyclohexanone: 370.0 parts
Stearic acid: 1.0 part
Amide stearate: 0.3 part
Butyl stearate: 2.0 parts
Polyisocyanate: 5.0 parts
  (Coronate L made by Nippon Polyurethane Industry Co., Ltd.)
(Preparation of Magnetic Layer-Forming Composition)
A magnetic layer-forming composition was prepared by the following method.

After kneading and dilution processing the above magnetic liquid in an open kneader, 30 passes of dispersion processing were conducted at a bead fill rate of 80 volume %, a rotor tip peripheral speed of 10 m/s, and a single pass retention time of 2 minutes in a horizontal bead mill disperser using zirconia ($ZrO_2$) beads 0.1 mm in bead diameter (referred to as "Zr beads" hereinafter).

As regards the abrasive liquid, the above components were mixed and then charged with Zr beads 0.3 mm in bead diameter to a horizontal bead mill disperser. The bead volume/(abrasive liquid volume+bead volume) was adjusted to 80% and bead mill dispersion processing was conducted for 120 minutes. Following processing, the liquid was removed and a flow-type ultrasonic dispersion and filtration device was used to conduct an ultrasonic dispersion and filtration treatment.

The magnetic liquid, abrasive liquid, and protrusion-forming agent liquid, as well as other components in the form of the lubricants and curing agent liquid were introduced into a dissolver stirrer and stirred for 30 minutes at a peripheral speed of 10 m/s. Subsequently, three passes of treatment at a flow rate of 7.5 kg/min were conducted with a flow-type ultrasonic disperser and the dispersion was filtered through a filter with a pore diameter of 1 μm to prepare a magnetic layer-forming composition.

(Preparation of Nonmagnetic Layer-Forming Composition)
A nonmagnetic layer-forming composition was prepared by the following method.

With the exception of the lubricants (stearic acid, amide stearate, and butyl stearate), the above components were kneaded and dilution processed in an open kneader. Subsequently, they were dispersion treated in a horizontal bead mill disperser. The lubricants (stearic acid, amide stearate, and butyl stearate) were then added and the mixture was stirred and mixed in a dissolver stirrer to prepare a nonmagnetic layer-forming composition.

(Preparation of Backcoat Layer-Forming Composition)
A backcoat layer-forming composition was prepared by the following method.

With the exception of the polyisocyanate and lubricants (stearic acid, amide stearate, and butyl stearate), the above components were charged to a dissolver stirrer, stirred for 30 minutes at a peripheral speed of 10 m/s, and then dispersion processed in a horizontal bead mill disperser. Subsequently, the polyisocyanate and lubricants (stearic acid, amide stearate, and butyl stearate) were added and the mixture was stirred and mixed in a dissolver stirrer to prepare a backcoat layer-forming composition.

(Fabrication of Magnetic Tape)

The nonmagnetic layer-forming composition was coated and dried to a dry thickness of 0.10 μm on one surface of a nonmagnetic support (polyamide support) 4.00 μm in thickness. Subsequently, the backcoat layer-forming composition was coated and dried to a dry thickness of 0.50 μm on the surface on the opposite side of the nonmagnetic support. The nonmagnetic support, having been wound up on a winding roll, was heat treated for 36 hours in an environment of an atmospheric temperature of 70° C.

Following the heat treatment, the magnetic layer-forming composition was coated and dried to a dry thickness of 70 nm on the nonmagnetic layer.

The thickness of each of the above layers is the design thickness calculated from the manufacturing conditions.

Subsequently, a surface-smoothing treatment (calendering treatment) was conducted at a calender roll surface temperature of 110° C., a linear pressure of 300 kg/cm (294 kN/m), and a speed of 100 m/min with a calender comprised only of metal rolls. The more intense the calendering treatment conditions (for example, the higher the surface temperature of the calender rolls was raised), the lower the magnetic layer surface Ra tended to be.

Subsequently, a heat treatment was conducted for 36 hours in an environment of an atmospheric temperature of 70° C. Following the heat treatment, the product was slit to ½ inch (0.0127 meter) width.

Next, after winding onto a reel into roll form the magnetic tape obtained by a surface treatment (the embodiment shown in FIGS. 1 to 3 of Japanese Unexamined Patent Application (KOKAI) Heisei No. 5-62174) employing the diamond wheel described in the same publication, the properties thereof were evaluated by the following evaluation method.

Examples 2 to 9, Comparative Examples 1 to 8

With the exceptions that the formula of the magnetic layer-forming composition and/or the manufacturing conditions shown in Table 2 were changed, magnetic tapes were prepared by the same method as in Example 1.

The formula ratios of ferromagnetic hexagonal barium ferrite powder given in Table 2 are the contents by weight of the individual ferromagnetic hexagonal barium ferrite powders per 100.0 weight parts of the total quantity of ferromagnetic powder. The average particle size of the ferromagnetic hexagonal barium ferrite powders given in Table 2 is a value obtained by collecting a required quantity from the powder lot employed to fabricate the magnetic tapes, and measuring the average particle size by the method set forth above. Following measurement, the ferromagnetic hexagonal barium ferrite powder was used to prepare the magnetic liquid for fabricating magnetic tapes.

[Evaluation Methods]

(1) Magnetic Layer Surface Ra

An atomic force microscope (AFM, Nanoscope 4 made by Veeco) was employed to measure a 40 μm×40 μm measurement area and the centerline average surface roughness Ra was determined on the surface of the magnetic layer of the magnetic tape. The scan rate (probe displacement rate) was 40 μm/s and the resolution was 512 pixels×512 pixels.

(2) Base Portion Friction

Scribe marks were made in advance with a laser marker on the measurement surface and an atomic force microscope (AFM) image was measured in a portion at a certain distance (about 100 μm) from them. This was done at a viewing area 7 μm square. As set forth further below, to facilitate the pickup up of a scanning electron microscope (SEM) image at the spot, a hard (single crystal silicon) cantilever was installed and scribe marks were made on the AFM. All protrusions with a height of greater than or equal to 15 nm above the reference plane were extracted from the AFM image thus measured. The spot where no protrusions were found was specified as the base portion. The base portion friction was measured by the method described above using a TI-950 Triboindenter made by Hysitron Corp.

A SEM image was measured at the same spot where the AFM had been measured and a component map was obtained. The protrusions greater than or equal to 15 nm in height above the reference plane that were extracted were determined to be protrusions formed of alumina or colloidal silica. In Examples 1 to 9, in the component map by SEM, alumina and colloidal silica were not confirmed on the base portion. Component analysis was performed there by SEM. However, component analysis is not limited to SEM, and can be conducted by known methods such as energy dispersive X-ray spectrometry (EDS), auger electron spectroscopy (AES), or the like.

(3) 1-Bromonaphthalene Contact Angle

The contact angle was measured by the following method with a contact angle measuring device (Drop Master 700 contact angle measuring device made by Kyowa Interface Science (Ltd.)).

A tape sample, obtained by cutting a prescribed length from one end of a magnetic tape that had been wound into a roll, was placed on a slide glass such that the surface of the backcoat layer was in contact with the surface of the slide glass. A 2.0 μL quantity of measurement liquid (1-bromonaphthalene) was dripped onto the surface of the tape sample (surface of the magnetic layer). After visual confirmation of stable droplet formation, the droplet image was analyzed by contact angle analysis software FAMAS that came with the above contact angle measuring device and the contact angle of the tape sample and the droplet was measured. The contact angle was calculated by the θ/2 method. The arithmetic average of 6 measurements taken for each sample was adopted as the 1-bromonaphthalene contact angle measured on the surface of the magnetic layer. The measurement was conducted in an environment of a temperature of 25° C. and 25% relative humidity. The 1-bromonaphthalene contact angles were obtained under the following analysis conditions.

Method: Liquid drop method (θ/2 method)
Recognition of liquid attachment: automatic
Liquid attachment recognition line (distance from top of needle): 50 dot
Algorithm: automatic
Image mode: frame
Threshold level: automatic (4) Water Contact Angle A new tape sample was cut from the same magnetic tape roll as in (3) above and the water contact angle was measured on the surface of the magnetic layer by the same method as in (3) above with the exception that the measurement-use liquid was replaced with water.

(5) Initial Abrasiveness of Surface of Magnetic Layer and Abrasiveness after Repeated Running The abrasion width of an AlFeSil square bar was measured after running the magnetic tapes of Examples and Comparative Examples under the running conditions set forth below using a reel tester in an environment of an atmospheric temperature of 23° C. and 10% relative humidity. The term "AlFeSil square bar" refers to a square bar made of AlFeSil, which is an alloy of Sendust. The AlFeSil square bar specified by European Computer Manufacturers Association (ECMA)-288/Annex H/H2 was employed in the evaluation. The abrasion width of the AlFeSil square bar was determined as the abrasion width (AlFeSil abrasion width) described in Japanese Unexamined Patent Publication (KOKAI) No. 2007-026564, which is expressly incorporated herein by reference in its entirety, paragraph 0015, based on FIG. 1 of the same publication, by observing the edge of the AlFeSil square bar from above with an optical microscope.

<Running Conditions>

The surface of the magnetic layer of the magnetic tape was brought into contact with one edge of the AlFeSil square bar at a lap angle of 12 degrees in a manner perpendicular to the longitudinal direction of the AlFeSil square bar. In that state, a 580 m length of magnetic tape was run back and forth at a speed of 3 m/s under a tension of 1.0 N. The AlFeSil abrasion width measured after being run back and forth once is given in Table 2 as the initial abrasion width.

Subsequently, the magnetic tape was run back and forth 49 times (thus, back and forth a total of 50 times) under the same conditions at the same spot on the AlFeSil square bar. The AlFeSil abrasion width that was then measured is given in Table 2 as the abrasion width after repeated running.

When both the initial abrasion width and the abrasion width after repeated running are greater than or equal to 30 μm, the abrasiveness of the surface of the magnetic layer can be determined to be suitable during both initial running and repeated running.

(6) Initial Signal-to-Noise Ratio (SNR) and Drop in SNR with Repeated Running

The electromagnetic characteristics (signal-to-noise ratio (SNR)) during initial running and repeated running of the magnetic tapes of Examples and the Comparative Examples were measured by the following method using a ½ inch (0.0127 meter) reel tester on which a head had been secured in an environment of an atmospheric temperature of 23° C. and 10% relative humidity.

A head/tape relative speed of 5.5 m/s was adopted and a recording head in the form of a metal-in-gap (MIG) head (gap length: 0.15 μm, track width: 1.0 μm) was employed.

The recording current was set to the optimal recording current for each magnetic tape and recording was conducted. Reproduction was conducted with a reproduction head in the form of a giant-magnetoresistive (GMR) head with a read width of 0.5 μm, a shield spacing of 0.1 μm, and an element thickness of 15 nm. A signal was recorded at a linear recording density of 300 kfci, and the reproduced signal was measured with a spectrum analyzer made by Shibasoku Corp. The ratio of the carrier signal output to the integrated noise of the full spectral band was adopted as the SNR. The portion of the signal that had adequately stabilized after the start of magnetic tape running was employed as the signal.

The SNR after the first pass and the SNR after the 500th pass of running were measured using a magnetic tape 1,000 m in length under the above conditions. Table 2 shows the SNR after the first pass of running as the initial SNR. The initial SNR that is recorded in Table 2 is the relative value when the initial SNR of Comparative Example 1 was adopted as a reference (0 dB). The drop in SNR after 500 passes of running relative to the initial SNR is shown in Table 2 as the amount of drop in SNR with repeated running. The amount of drop in SNR with repeated running that is given in Table 2 is a value obtained by calculating the SNR after 500 passes of repeated running for each magnetic tape as a relative value when the initial SNR of Comparative Example 1 was adopted as a reference (0 dB), using the calculated value to calculate the "initial SNR-SNR after 500 passes of running", and placing a minus sign in front of the value. When the initial SNR is greater than or equal to 1.0 dB and the drop in SNR after repeated running is less than −1.0 dB, the electromagnetic characteristics can be determined to be good during initial running and repeated running.

In the magnetic tape of Comparative Example 8, in which the 1-bromonaphthalene contact angle measured on the surface of the magnetic layer was greater than 60.0°, scratches ended up forming on the read element of the head during the first pass, precluding measurement of the initial SNR and the SNR after 500 passes of running.

The results of the above are given in Table 2.

TABLE 2

| | | | Unit | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|---|---|
| Magnetic layer-forming composition | Ferromagnetic hexagonal barium ferrite powder (1) | Average particle size | nm | 25 | 25 | 25 | 25 | 25 | 25 | 25 | 25 | 25 |
| | | Formula ratio | % | 99.0 | 99.0 | 99.0 | 99.2 | 95.0 | 99.0 | 99.0 | 99.0 | 99.0 |
| | Ferromagnetic hexagonal barium ferrite powder (2) | Average particle size | nm | 55 | 55 | 55 | 55 | 55 | 55 | 55 | 55 | 55 |
| | | Formula ratio | % | 1.0 | 1.0 | 1.0 | 0.8 | 5.0 | 1.0 | 1.0 | 1.0 | 1.0 |
| | 1-Bromonaphthalene contact angle-adjusting | Type | — | A | A | A | A | A | A | A | B | — |
| | | Quantity added | Parts | 20.0 | 10.0 | 30.0 | 20.0 | 20.0 | 20.0 | 20.0 | 6.0 | — |
| | Stearic acid | Quantity added | Parts | 3.0 | 3.0 | 3.0 | 3.0 | 3.0 | 3.0 | 3.0 | 3.0 | 10.0 |
| Manufacturing condition | Calendering condition | Calender roll surface temp. | ° C. | 110 | 110 | 110 | 110 | 110 | 100 | 120 | 110 | 110 |
| Surface properties of magnetic layer | Centerline average surface roughness Ra | | nm | 1.6 | 1.6 | 1.6 | 1.6 | 1.6 | 1.8 | 1.4 | 1.6 | 1.6 |
| | 1-Bromonaphthalene contact angle | | ° | 54.2 | 45.1 | 60.0 | 54.2 | 54.3 | 54.2 | 54.2 | 54.1 | 46.8 |
| | Water contact angle | | ° | 97.2 | 97.4 | 97.0 | 97.2 | 97.3 | 97.5 | 97.2 | 96.8 | 101.2 |
| | Base portion friction | | — | 0.28 | 0.28 | 0.28 | 0.35 | 0.20 | 0.28 | 0.28 | 0.28 | 0.28 |
| Performance | Abrasion width | Initial | μm | 35 | 35 | 35 | 35 | 35 | 35 | 35 | 35 | 35 |
| | | After repeated running | μm | 33 | 33 | 33 | 32 | 34 | 33 | 33 | 33 | 32 |
| | Initial SNR | | dB | 2.2 | 2.2 | 2.2 | 2.2 | 2.2 | 1.2 | 3.5 | 2.2 | 2.2 |
| | Amount of drop in SNR with repeated running | | dB | −0.5 | −0.5 | −0.5 | −0.8 | −0.6 | −0.5 | −0.5 | −0.5 | −0.8 |

TABLE 2-continued

| | | | Unit | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 |
|---|---|---|---|---|---|---|---|---|---|---|---|
| Magnetic layer-forming composition | Ferromagnetic hexagonal barium ferrite powder (1) | Average particle size | nm | 25 | 25 | 25 | 25 | 25 | 25 | 25 | 25 |
| | | Formula ratio | % | 100.0 | 100.0 | 100.0 | 100.0 | 100.0 | 99.3 | 99.0 | 99.0 |
| | Ferromagnetic hexagonal barium ferrite powder (2) | Average particle size | nm | — | — | — | — | — | 55 | 55 | 55 |
| | | Formula ratio | % | — | — | — | — | — | 0.7 | 1.0 | 1.0 |
| | 1-Bromonaphthalene contact angle-adjusting | Type | — | — | — | — | — | A | — | — | A |
| | | Quantity added | Parts | — | — | — | — | 10 | — | — | 40 |
| | Stearic acid | Quantity added | Parts | 3.0 | 3.0 | 3.0 | 3.0 | 3.0 | 3.0 | 3.0 | 3.0 |
| Manufacturing condition | Calendering condition | Calender roll surface temp. | °C. | 90 | 100 | 110 | 120 | 100 | 100 | 100 | 100 |
| Surface properties of magnetic layer | Centerline average surface roughness Ra | | nm | 2.3 | 1.8 | 1.6 | 1.4 | 1.6 | 1.6 | 1.6 | 1.6 |
| | 1-Bromonaphthalene contact angle | | ° | 40.0 | 40.1 | 40.0 | 40.2 | 45.0 | 40.2 | 40.0 | 65.3 |
| | Water contact angle | | ° | 97.2 | 96.8 | 96.5 | 97.2 | 96.4 | 97.1 | 96.8 | 97.0 |
| | Base portion friction | | — | 0.45 | 0.45 | 0.45 | 0.45 | 0.45 | 0.37 | 0.28 | 0.28 |
| Performance | Abrasion width | Initial | μm | 15 | 15 | 15 | 15 | 35 | 15 | 15 | 55 |
| | | After repeated running | μm | 14 | 12 | 11 | 9 | 25 | 12 | 14 | 52 |
| | Initial SNR | | dB | 0 | 1.2 | 2.2 | 3.5 | 2.2 | 2.2 | 2.2 | Measurement was not possible. |
| | Amount of drop in SNR with repeated running | | dB | −1.0 | −4.5 | −5.0 | −5.5 | −2.0 | −4.5 | −4.0 | Measurement was not possible. |

Based on the results shown in Table 2, the surface of the magnetic layers of the magnetic tapes of Examples were found to exhibit good abrasiveness both during initial running and repeated running at low humidity despite the smooth surface of the magnetic layer. The reason that the electromagnetic characteristics of the magnetic tapes of Examples were good during both initial running and repeated running was thought to be that the surface of the magnetic layer was able to remove foreign material that had adhered to the head due to the good abrasiveness of the surface of the magnetic layer.

The presence and degree of head edge deposits after repeated running was evaluated by the following method for the magnetic tapes of Examples 1 to 9

A magnetic recording and reproduction head removed from a Linear Tape-Open (LTO (Japanese registered trademark) Generation 5 (G5) drive made by IBM Corp. was mounted on a tape running system in an environment of an atmospheric temperature of 23° C. and 10% relative humidity, and 3,000 cycles were run at 4.0 m/s while feeding out a magnetic tape 20 m in length from a feed roll and winding it up on a pickup roll while applying a tension of 0.6 N. After running, the head was observed under a microscope at 100-fold magnification. Image processing was conducted with image processing software (WinRoof (developed by Mitani Corporation)) to calculate the percentage of the area where deposits had adhered to the edges of the head. The percentage of the area where deposits had adhered to the edge of the head was adopted as an indicator of the presence and degree of head edge deposits and evaluated on the following scale.

4: No head edge deposits found. 3: Head edge deposits found on less than or equal to 50% of the area. 2: Head edge deposits found on more than 50% but less than or equal to 70% of the area. 1: Head edge deposits found on more than 70% of the area.

Evaluation results: The evaluation result of the magnetic tapes of Examples 1 to 8 was "4". The evaluation result of the magnetic tape of Example 9 was "3". Example 9 was an example in which only lubricant was employed as the 1-bromonaphthalene contact angle-adjusting component. The head edge deposits found in Example 9 were thought to be lubricant that had been transferred from the surface of the magnetic layer.

An aspect of the present invention is useful in the technical field of magnetic tapes for data storage, such as backup tapes.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
which comprises a magnetic layer comprising ferromagnetic powder, abrasive, and binder on a nonmagnetic support, wherein:
a centerline average surface roughness Ra measured on a surface of the magnetic layer is less than or equal to 1.8 nm;
a contact angle for 1-bromonaphthalene that is measured on the surface of the magnetic layer falls within a range of 45.0° to 60.0°; and
a coefficient of friction that is measured on a base portion of the surface of the magnetic layer is less than or equal to 0.35.

2. The magnetic tape according to claim 1,
wherein the centerline average surface roughness Ra falls within a range of 1.2 nm to 1.8 nm.

3. The magnetic tape according to claim 1,
wherein the centerline average surface roughness Ra falls within a range of 1.2 nm to 1.6 nm.

4. The magnetic tape according to claim 1,
wherein the coefficient of friction that is measured on the base portion of the surface of the magnetic layer falls within a range of 0.15 to 0.35.

5. The magnetic tape according to claim 1,
wherein the contact angle for 1-bromonaphthalene that is measured on the surface of the magnetic layer falls within a range of 45.1° to 60.0°.

6. The magnetic tape according to claim 1,
wherein the coefficient of friction that is measured on the base portion of the surface of the magnetic layer falls within a range of 0.20 to 0.35.

7. The magnetic tape according to claim 1,
wherein the contact angle for 1-bromonaphthalene that is measured on the surface of the magnetic layer falls within a range of 45.10° to 60.0°; and
the coefficient of friction that is measured on the base portion of the surface of the magnetic layer falls within a range of 0.20 to 0.35.

8. The magnetic tape according to claim 1,
wherein a contact angle for water measured on the surface of the magnetic layer falls within a range of 90.0° to 101.2°.

9. The magnetic tape according to claim 1,
wherein a contact angle for water measured on the surface of the magnetic layer falls within a range of 96.8° to 101.2°.

10. The magnetic tape according to claim 1,
wherein the contact angle for 1-bromonaphthalene that is measured on the surface of the magnetic layer falls within a range of 45.1° to 60.0°;
the coefficient of friction that is measured on the base portion of the surface of the magnetic layer falls within a range of 0.20 to 0.35; and
a contact angle for water measured on the surface of the magnetic layer falls within a range of 96.8° to 101.2°.

11. The magnetic tape according to claim 1,
wherein the magnetic layer comprises one or more lubricants selected from the group consisting of a fatty acid, a fatty acid ester, and a fatty acid amide.

12. The magnetic tape according to claim 1,
wherein the magnetic layer comprises a nitrogen-containing polymer.

13. The magnetic tape according to claim 12,
wherein the nitrogen-containing polymer is a polyalkyleneimine polymer.

14. The magnetic tape according to claim 13,
wherein the polyalkyleneimine polymer is a polymer comprising a polyalkyleneimine chain and a polyester chain.

15. The magnetic tape according to claim 1,
which comprises a nonmagnetic layer comprising nonmagnetic powder and binder between the nonmagnetic support and the magnetic layer.

16. The magnetic tape according to claim 1,
which comprises a backcoat layer comprising nonmagnetic powder and binder on an opposite side of the nonmagnetic support from that on which the magnetic layer is present.

* * * * *